US010568121B2

United States Patent
Nikopour et al.

(10) Patent No.: US 10,568,121 B2
(45) Date of Patent: Feb. 18, 2020

(54) SYSTEM AND METHOD FOR REDUCED SIGNALING TRANSMISSIONS IN A COMMUNICATIONS SYSTEM

(71) Applicant: Huawei Technologies Co., Ltd., Shenzhen (CN)

(72) Inventors: Hosein Nikopour, Ottawa (CA); Kelvin Kar Kin Au, Kanata (CA); Alireza Bayesteh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 13/789,737

(22) Filed: Mar. 8, 2013

(65) Prior Publication Data
US 2014/0254455 A1 Sep. 11, 2014

(51) Int. Cl.
| H04W 72/12 | (2009.01) |
| H04W 72/04 | (2009.01) |
| H04L 1/00 | (2006.01) |
| H04L 1/18 | (2006.01) |
| H04L 5/00 | (2006.01) |

(52) U.S. Cl.
CPC ....... *H04W 72/1273* (2013.01); *H04L 1/0009* (2013.01); *H04W 72/0466* (2013.01); *H04L 1/0026* (2013.01); *H04L 1/0027* (2013.01); *H04L 1/0038* (2013.01); *H04L 1/188* (2013.01); *H04L 1/1812* (2013.01); *H04L 5/0037* (2013.01); *H04L 5/0091* (2013.01)

(58) Field of Classification Search
CPC ............... H04L 5/0091; H04L 5/0037; H04W 72/1273; H04W 72/0466
See application file for complete search history.

(56) References Cited

U.S. PATENT DOCUMENTS

| 8,265,639 | B2 | 9/2012 | Cai et al. | |
|---|---|---|---|---|
| 8,270,352 | B2 | 9/2012 | Sankar et al. | |
| 2006/0018347 | A1 | 1/2006 | Agrawal | |
| 2009/0141690 | A1 | 6/2009 | Fan et al. | |
| 2009/0219870 | A1* | 9/2009 | Wengerter et al. | 370/329 |
| 2009/0257406 | A1* | 10/2009 | Sankar et al. | 370/336 |

(Continued)

FOREIGN PATENT DOCUMENTS

| CN | 101064582 A | 10/2007 |
|---|---|---|
| CN | 101485216 A | 7/2009 |

(Continued)

OTHER PUBLICATIONS

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

(Continued)

*Primary Examiner* — Peter Chen
(74) *Attorney, Agent, or Firm* — Slater Matsil, LLP

(57) ABSTRACT

A method for operating a communications controller includes assigning one or more code domain elements (CDE) of a transmission zone to each user equipment (UE) of a plurality of UEs being served by the communications controller and operating in the transmission zone and having a transmission available. The method also includes transmitting downlink information located in the one or more CDEs to the UEs without utilizing dynamic control signaling.

22 Claims, 19 Drawing Sheets

(56) References Cited

U.S. PATENT DOCUMENTS

| | | | |
|---|---|---|---|
| 2009/0262699 A1* | 10/2009 | Wengerter | H04L 1/0072 370/330 |
| 2009/0325626 A1* | 12/2009 | Palanki | H04L 5/0007 455/522 |
| 2010/0177722 A1* | 7/2010 | Guvenc | H04W 52/244 370/329 |
| 2011/0034192 A1* | 2/2011 | Lim et al. | 455/501 |
| 2011/0064043 A1* | 3/2011 | Balachandran et al. | 370/330 |
| 2012/0044892 A1* | 2/2012 | Guan et al. | 370/329 |
| 2014/0045508 A1* | 2/2014 | Bontu et al. | 455/450 |
| 2014/0126386 A1* | 5/2014 | Beale | H04W 72/044 370/252 |
| 2015/0023259 A1 | 1/2015 | Palanki et al. | |

FOREIGN PATENT DOCUMENTS

| | | | |
|---|---|---|---|
| EP | 1826939 A1 | | 8/2007 |
| EP | 1936887 A2 | | 6/2008 |
| EP | 2077646 A1 | | 7/2009 |
| GB | 2442262 | * | 4/2008 |
| JP | 2009537083 A | | 10/2009 |
| JP | 2009273172 A | | 11/2009 |
| JP | 2011503927 A | | 1/2011 |
| JP | 2011518478 A | | 6/2011 |
| JP | 2011526468 A | | 10/2011 |
| WO | 2007131558 A1 | | 11/2007 |
| WO | 2008024890 A2 | | 2/2008 |
| WO | 2009120048 A2 | | 10/2009 |
| WO | 2010058887 A1 | | 5/2010 |
| WO | 2010150133 A1 | | 12/2010 |

OTHER PUBLICATIONS

Hoshyar, R., et al., "LDS-OFDM an Efficient Multiple Access Technique," Centre for Communication Systems Research, University of Surrey, 2010, 5 pages.

Chinese Search Report of Patent Cooperation Treaty (PCT), PCT/CN2014/073072, Applicant: Huawei Technologies, Co., Ltd., dated Jun. 5, 2014, 19 pages.

"3rd Generation Partnership Project; Technical Specification Group Radio Access Network; Physical Channels and Mapping of Transport Channels Onto Physical Channels (FDD) (Release 11)," 3GPP TS 25.211 V11.2.0, Dec. 2012, pp. 1-63.

"3rd Generation Partnership Project; Technical Specification Group Radio Access Network; Spreading and Modulation (FDD) (Release 11)," 3GPP TS 25.213 V11.4.0, Dec. 2012, pp. 1-49.

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.1.0, Dec. 2012, pp. 1-108.

"3rd Generation Partnership Project; Technical Specification Group Radio Access Network; Evolved Universal Terrestrial Radio Access (E-UTRA); Physical Layer Procedures (Release 11)," 3GPP TS 36.213 V11.1.0, Dec. 2012, pp. 1-160.

Bayesteh, Alireza et al., "Blind Detection of SCMA for Uplink Grant-Free Multiple-Access," Wireless Communications Systems (ISWCS), Huawei Technologies Canada Co. Ltd, IEEE, 2014, 5 pages, Ottawa, Ontario, Canada.

* cited by examiner

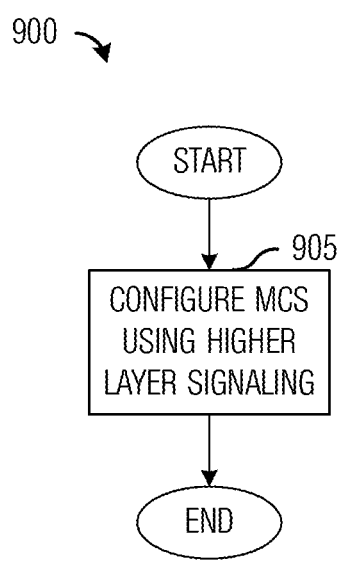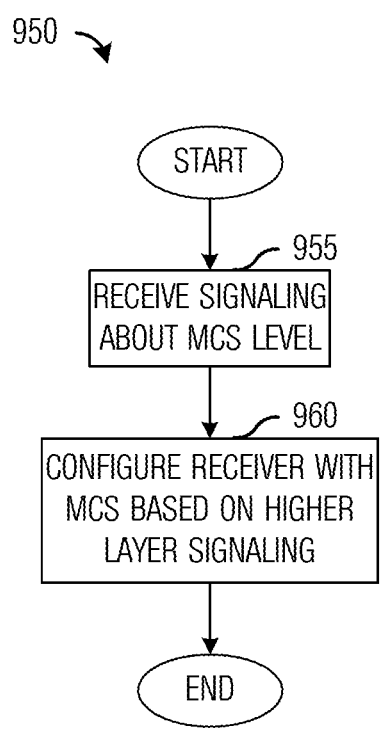
*Fig. 9a*
*Fig. 9b*

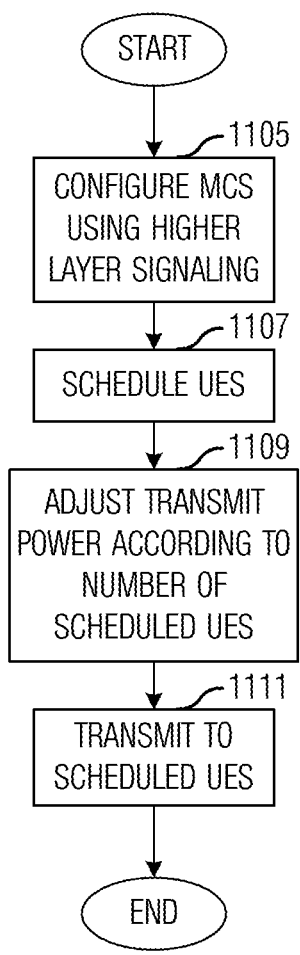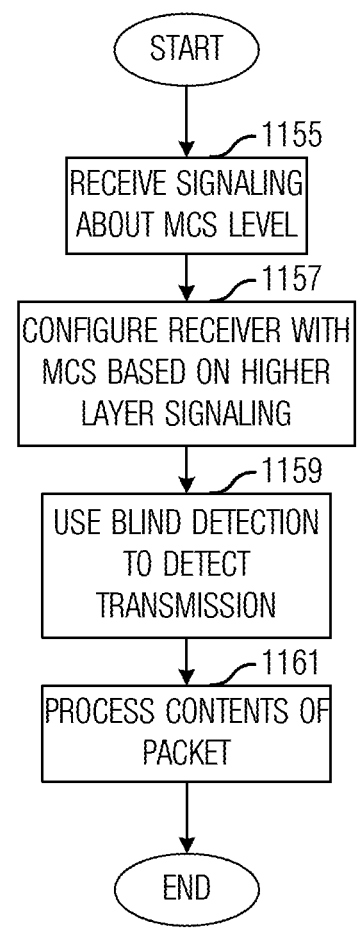
Fig. 11a
Fig. 11b

SYSTEM AND METHOD FOR REDUCED SIGNALING TRANSMISSIONS IN A COMMUNICATIONS SYSTEM

TECHNICAL FIELD

The present disclosure relates generally to digital communications, and more particularly to a system and method for reduced signaling transmissions in a communications system.

BACKGROUND

Typically, in a cellular communications system, such as a Third Generation Partnership Project (3GPP) Long Term Evolution (LTE) compliant communications system, when an evolved NodeB (also commonly referred to as a base station, a communications controller, a NodeB, a base terminal station, and the like) has a transmission to a user equipment (also commonly referred to as a mobile station, a terminal, a subscriber, a user, a mobile, and the like) or a transmission grant for the user equipment (UE), it signals control information about resource elements, modulation and coding scheme (MCS), multiple input-multiple output (MIMO) transmission mode, and the like, to the UE.

As the communications systems become more complex and capable of supporting more transmission modes, the amount of information signaled to the UE to enable communications increase. The increased amount of control information signaled consumes a larger percentage of communications system resources and negatively impact overall communications system performance. Therefore, there is a need for systems and methods for reducing signaling overhead in communications.

SUMMARY OF THE DISCLOSURE

Example embodiments of the present disclosure which provide a system and method for reduced signaling transmissions in a communications system.

In accordance with an example embodiment of the present disclosure, a method for operating a communications controller is provided. The method includes assigning, by the communications controller, one or more code domain elements (CDE) of a transmission zone to each user equipment (UE) of a plurality of UEs being served by the communications controller and operating in the transmission zone and having a transmission available. The method also includes transmitting, by the communications controller, downlink information located in the one or more CDEs to the UEs without utilizing dynamic control signaling.

In accordance with another example embodiment of the present disclosure, a method of operating a user equipment is provided. The method includes blindly detecting, by the user equipment, a first transmission in a plurality of network resources associated with a transmission zone, wherein the first transmission is separated in a code domain from a second transmission also located in the plurality of network resources, and wherein the first transmission and the second transmission are separated by codes from a known codebook, and attempting, by the user equipment, to decode the first transmission. The method also includes determining, by the user equipment, if the first transmission is intended for the user equipment if the user equipment is able to decode the first transmission, and repeating, by the user equipment, the blindly detecting, the attempting to decode, and the determining for a remainder of the known codebook if the first transmission is not intended for the user equipment.

In accordance with another example embodiment of the present disclosure, a communications controller is provided. The communications controller includes a processor, and a transmitter operatively coupled to the processor. The processor assigns one or more code domain element (CDE) of a transmission zone to each user equipment (UE) of a plurality of UEs being served by the communications controller and operating in the transmission zone and having a transmission available. The transmitter downlinks information located in the one or more CDEs to the UEs without utilizing dynamic control signaling.

In accordance with another example embodiment of the present disclosure, a user equipment is provided. The use equipment includes a processor. The processor blindly detects a first transmission in a plurality of network resources associated with a transmission zone, wherein the first transmission is separated in a code domain from a second transmission also located in the plurality of network resources, and wherein the first transmission and the second transmission are separated by codes from a known codebook. The processor also attempts to decode the first transmission, to determine if the first transmission is intended for the user equipment if the user equipment is able to decode the first transmission, and repeats the blindly detecting, the attempting to decode, and the determining for a remainder of the known codebook if the first transmission is not intended for the user equipment.

In accordance with another example embodiment of the present disclosure, a method for operating a communications controller is provided. The method includes transmitting, by the communications controller, a first transmission to a user equipment, the first transmission assigned to a code domain element (CDE) in a first transmission zone of a first subframe. The method also includes transmitting, by the communications controller, a first retransmission to the user equipment, the first retransmission assigned to the CDE in the first transmission zone of a second subframe, in response to determining that a first positive acknowledgement corresponding to the first transmission has not been received within a first specified time, wherein the second subframe occurs at a second specified time after the first subframe.

In accordance with another example embodiment of the present disclosure, a method for operating a user equipment is provided. The method includes determining, by the user equipment, that a first transmission intended for the user equipment is not decodable, wherein the first transmission is associated with a code domain element (CDE) of a transmission zone and is received in a first subframe, and attempting, by the user equipment, to recover the first transmission by combining buffered data associated with the CDE of the transmission zone from up to a maximum number of subframes. The method also includes transmitting, by the user equipment, an acknowledgement to a source of the first transmission if the user equipment is able to recover the first transmission.

In accordance with another example embodiment of the present disclosure, a communications controller is provided. The communications controller includes a transmitter. The transmitter transmits a first transmission to a user equipment, the first transmission assigned to a code domain element (CDE) in a first transmission zone of a first subframe, and transmits a first retransmission to the user equipment, the first retransmission assigned to the CDE in the first transmission zone of a second subframe, in response to determining that a first positive acknowledgement corresponding to the first transmission has not been received within a first specified time, wherein the second subframe occurs at a second specified time after the first subframe.

In accordance with another example embodiment of the present disclosure, a user equipment is provided. The user equipment includes a processor, and a transmitter operatively coupled to the processor. The processor determines that a first transmission intended for the user equipment is not decodable, wherein the first transmission is associated with a code domain element (CDE) of a transmission zone and is received in a first subframe, and attempts to recover the first transmission by combining buffered data associated with the CDE of the transmission zone from up to a maximum number of subframes. The transmitter transmits an acknowledgement to a source of the first transmission if the user equipment is able to recover the first transmission.

One advantage of an embodiment is that the signaling required for transmissions is reduced, thereby easing communications overhead, especially for small data payload transmissions.

A further advantage of an embodiment is that a reduced signaling hybrid automatic repeat requested (HARQ) process is provided to permit error detection and error correction with reduced signaling.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 9a illustrates an example flow diagram of operations occurring in an eNB as the eNB configures an SSFTx zone with a fixed MCS level according to example embodiments described herein;

FIG. 9b illustrates an example flow diagram of operations occurring in a UE as the UE configures its decoder in accordance with a fixed MCS level according to example embodiments described herein;

FIG. 11a illustrates an example flow diagram of operations occurring in an eNB as the eNB adjusts a transmit power level of transmissions to UEs operating in an SSFTx zone according to example embodiments described herein;

FIG. 11b illustrates an example flow diagram of operations occurring in a UE as the UE receives a transmission wherein the transmit power level of the transmission is adaptable by an eNB according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to reduced signaling transmissions in a communications system. For example, at a communications controller, the communications controller assigns one or more code domain element (CDE) of a transmission zone to each user equipment (UE) operating with the transmission zone and having a transmission available, maps the CDEs to a plurality of network resources associated with the transmission zone, and broadcasts the plurality of resources to the UEs. As another example, at a communications controller, the communications controller transmits a first transmission to a user equipment, the first transmission assigned to a code domain element (CDE) in a first transmission zone of a first subframe, and transmits a first retransmission to the user equipment, the first retransmission assigned to the CDE in the first transmission zone of a second subframe, in response to determining that a positive acknowledgement corresponding to the first transmission has not been received, wherein the second subframe occurs at a specified time after the first subframe.

The present disclosure will be described with respect to example embodiments in a specific context, namely a 3GPP LTE compliant communications system. The disclosure may also be applied, however, to other standards compliant and non-standards compliant communications systems.

Figure 1:
FIG. 1 illustrates an example communications system according to example embodiments described herein.
Figure 1:
Figure 1:
Figure 1:
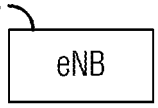
Figure 1:
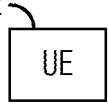
Figure 1:
Figure 1:
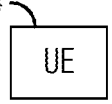
Figure 1:
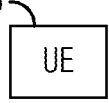

FIG. 1 illustrates a communications system 100. Communications system 100 includes an eNB 105. eNB 105 may wirelessly serve a plurality of UE, such as UE 110, UE 112, UE 114, and UE 116. Usually, communications to a UE or from a UE must flow through eNB 105. While it is understood that communications systems may employ multiple eNBs capable of communicating with a number of UEs, only one eNB, and a number of UEs are illustrated for simplicity.

In general, there are three levels of signaling:

1) Network configuration broadcast signaling, which may be characterized as very slow rate signaling;

2) Radio link control (RLC), which may be characterized as slow rate signaling. RLC signaling may be on a per UE basis; and 3) Dynamic scheduling signaling such as with a physical downlink control channel (PDCCH) in 3GPP LTE. In general, dynamic scheduling signaling may be characterized as fast rate signaling. It is noted that dynamic scheduling signaling is very high overhead signaling, especially for small packets.

In a 3GPP LTE compliant communications system, typical content of dynamic scheduling signaling may include:

Resource allocation information such as time information (e.g., transmission time interval (TTI), and the like), frequency information (e.g., resource block (RB), resource block group (RBG), and the like), and code information (e.g., code division multiple access (CDMA) signature, sparse code multiple access (SCMA) codebook, and the like), and the like;

Link adaptation information such as modulation level, code rate, transmit power level, and the like; and Hybrid automatic repeat requested (HARM) supporting signaling.

It is noted that many current and future applications, such as real-time applications, instant messaging, machine to machine (M2M) traffic, status update messages, and the like, generate small packets. The signaling overhead is exaggerated with small packets. As an illustrative example, consider the following situation: Assume that 50 users are supported in a single cell with each user occupying 1 resource block (RB) on a downlink channel. Then, the signaling overhead per user is equal to 2 control channel elements (CCEs) for a downlink grant and 2 CCEs for an uplink grant for a total of 4 CCEs per user. The number of resource elements (REs) for the control channel per user is expressible as $$REs \text{ per user} = 4 \ CCE * \frac{36 \ REs}{CCE} = 144 \ REs.$$

Therefore, the overhead is expressible as $$Overhead = \frac{144 \ REs}{user} * \frac{50 \ user}{12*14*50 \ REs} = 86\%.$$

With an overhead of 86%, there is very little room for data transmission.

Figure 2:
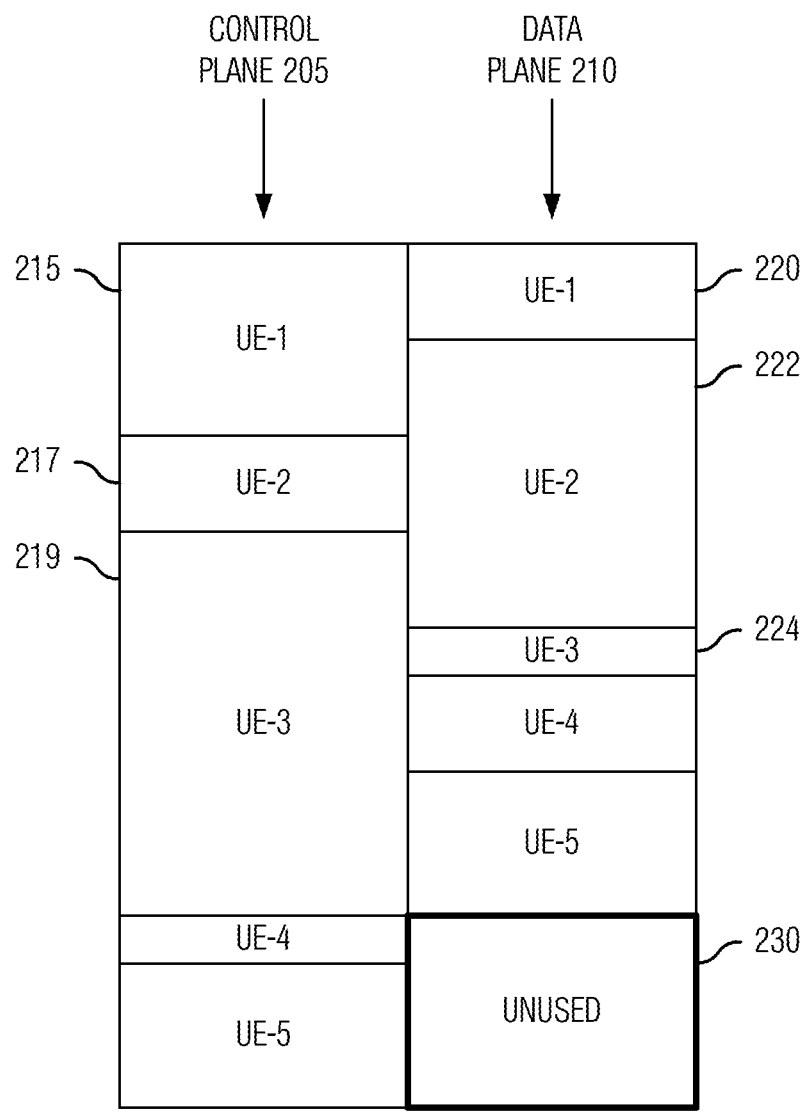
FIG. 2 illustrates an example control plane and data plane according to example embodiments described herein.

FIG. 2 illustrates a control plane 205 and a data plane 210. Control plane 205 illustrates signaling to a variety of UE, such as UE-1 215, UE-2 217, and UE-3 219. Data plane 210 illustrates transmission of data to a variety of UE, such as UE-1 220, UE-2 222, and UE-3 224. Signaling in control plane 205 indicate allocation of resources in data plane 210. As an example, signaling in control plane 205 to UE-1 215 correspond to resources (UE-1 220) in data plane 210. Once resources of control plane 205 are used, unused resources in data plane 210 remain unused. As an example, unused resource 230 of data plane 210 may arise due to limitation of control plane 205. The unused resources (e.g., unused resources 230) may be used for other forms of communications.

As noted above, unused resources in data plane 210 may be used in communications if control plane 205 signaling is not required to make use of the resources. According to an example embodiment, it may be possible to eliminate control plane signaling if blind detection is used at a UE (or in general, a receiving device). Blind detection may allow the UE to detect the information typically transmitted without using dynamic scheduling signaling, such as resource allocation information, link adaptation, and HARQ signaling. As an illustrative example, a receiving device, such as a UE, may use blind detection to detect information by testing a plurality of hypotheses upon resources that it receives. If a hypothesis tested is correct, then the UE will obtain a comprehensible result. If a hypothesis tested is incorrect, then the UE will obtain an incomprehensible result. Example hypotheses include possible resource allocations, link adaptation values, HARQ transmissions, and the like.

Figure 3:
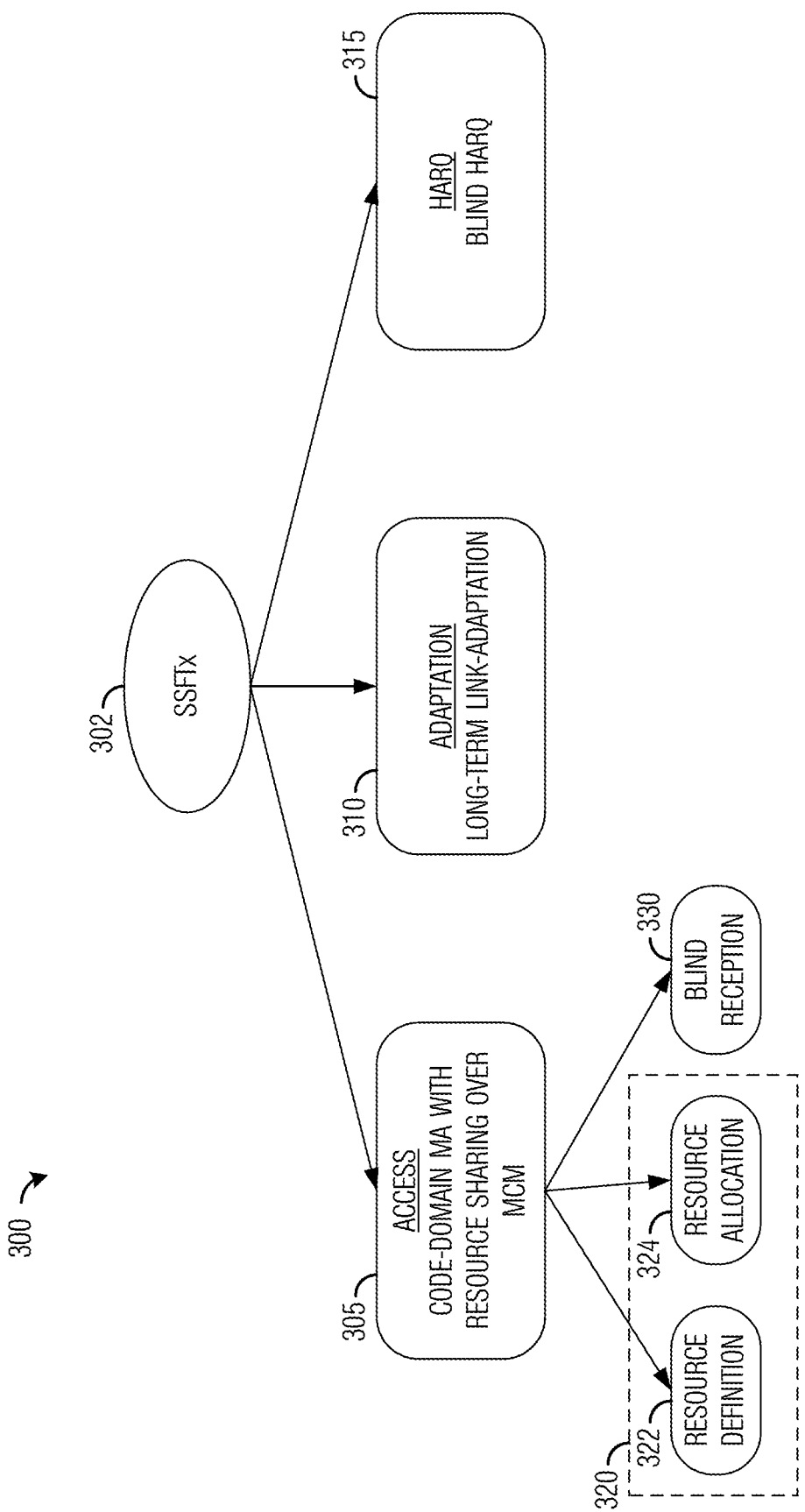
FIG. 3 illustrates an example framework for communications without dynamic (or fast rate) control signaling according to example embodiments described herein.

FIG. 3 illustrates a framework 300 for communications without dynamic (or fast rate) control signaling. To enable communications without dynamic control signaling, several slow signaling mechanisms are presented. They include:

Transmission mode configuration that is signaled to UE through use of a broadcast channel to indicate whether or not a communications system supports communications without dynamic control signaling;

UE capability exchange with the communications system to indicate whether or not a UE supports communications without dynamic control signaling;

Search space and access codes may be signaled to UE through a broadcast channel and updated using a slow signaling channel. The maximum size of the access code set may also be updated and signaled to the UEs using a slow signaling channel; and Modulation and coding scheme (MCS) setting may be signaled to a UE through a broadcast channel and updated using a slow signaling channel.

Framework 300 highlights a scheduling signaling free transmission (SSFTx) structure 302. SSFTx structure 302 includes support for no dynamic control signaling scheduling access 305, no dynamic control signaling scheduling adaptation (link adaptation) 310, and no dynamic control signaling scheduling HARQ 315. No dynamic control signaling scheduling access 305 may include code domain multiple access with resource sharing over multi-carrier modulation (MCM) such as code division multiple access orthogonal frequency division multiplexing (CDMA-OFDM), low density signature OFDM (LDS-OFDM), SCMA-OFDM, and the like, with no dynamic control signaling for resource definition 322 and resource allocation 324 (collectively referred to as resource management 320). At a UE (i.e., a receiving device), no dynamic control signaling scheduling access 305 may include blind code domain reception without active code and/or signature knowledge 330. No dynamic control signaling scheduling adaptation 310 may include long term link adaptation without dynamic control signaling support. No dynamic control signaling scheduling HARQ 315 may include blind HARQ operation without dynamic control signaling support. Detailed discussions of each part of SSFTx 302 are provided below.

Figure 4:
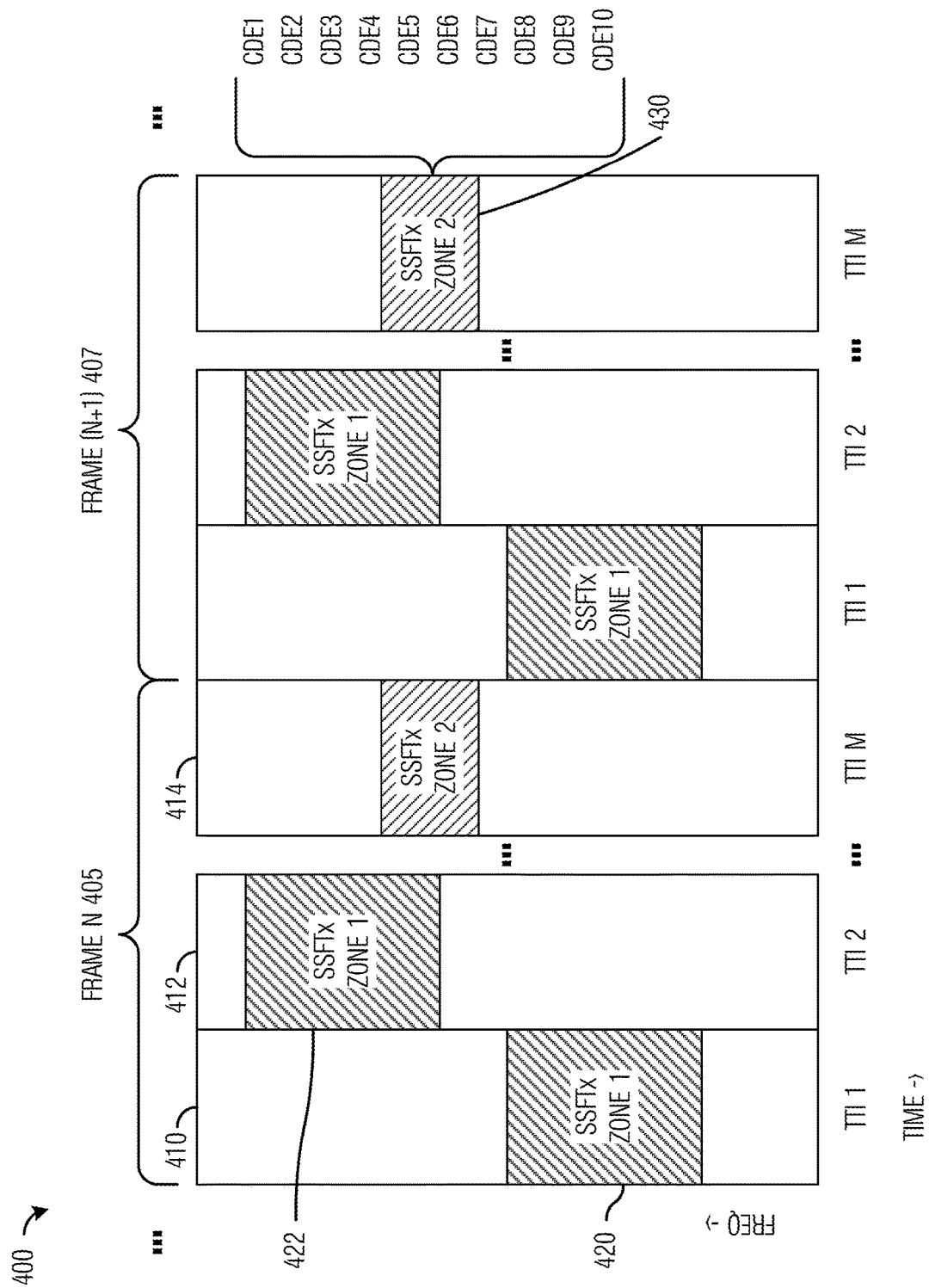
FIG. 4 illustrates an example plurality of frames of a communications system supporting communications without dynamic control signaling according to example embodiments described herein.

FIG. 4 illustrates a plurality of frames 400 of a communications system supporting communications without dynamic control signaling. FIG. 4 highlights a frame structure of frame N 405 and frame N+1 407. It is noted that plurality of frames 400 may include other frames, but only two frames are illustrated for discussion purposes. It is also noted that the frame structure of frame N 405 is identical to the frame structure of frame N+1 407. Therefore, discussion of specific structures of frame N 405 also applies to specific structures of frame N+1 407 and vice versa.

As shown in FIG. 4, frame N 405 includes a plurality of TTIs, such as TTI 1 410, TTI 2 412, and TTI M 414. Within some of the TTIs, there may be some resources (e.g., time resources, frequency resources, or time-frequency resources) reserved for scheduling dynamic control signaling free transmissions. Such resources within each TTI may be referred to as a SSFTx zone. As an example, in TTI 1 410, there is a SSFTx zone 1 420, and in TTI 2 412, there is another SSFTx zone 1 422. It is noted that there may not be a SSFTx zone in each TTI (although in FIG. 4, every shown TTI has a SSFTx zone). It is also noted that a single SSFTx zone may span multiple TTIs. As an example, SSFTx zone 1 (blocks 420 and 422) spans TTI 1 410 and TTI 2 412. It is further noted that unless specifically changed by an eNB through messaging on a slow signaling channel or a very slow signaling channel, SSFTx zone configuration for consecutive frames are identical. As shown in FIG. 4, frame N 405 and frame N+1 407 have identical SSFTx zone configuration. It is additionally noted that the SSFTx zone configuration may be defined in a logical domain. The logical domain is mapped to actual physical resources through a predefined mapping rule. The mapping of logical to physical domain may change from frame to frame.

Within a SSFTx zone, e.g., SSFTx zone 2 430 of frame N+1 407, the resources may be associated with a plurality of code domain elements (CDEs). As an example, SSFTx zone 2 430 may be associated with 10 CDEs, such as CDE1, CDE2, up to CDE10. It is noted that each CDE may be associated with a subset of the resources of the SSFTx zone. As an illustrative example, each CDE may be associated with an entirety of the resources of the SSFTx zone. As another illustrative example, some CDEs may be associated with an entirety of the resources of the SSFTx zone (i.e., the CDEs fully occupies the resources of the SSFTx zone), while other CDEs may be associated with a portion of the resources of the SSFTx zone. As yet another illustrative example, the CDEs may each be associated with a portion of the resources of the SSFTx zone.

Each CDE may be separated in the code domain, meaning that cross correlation between the respective CDEs of the SSFTx zone is low or zero. In other words, the CDEs may be said to be orthogonal to one another. As an illustrative example, information of a transmission corresponding to a first CDE is separated in the code domain to information of a transmission corresponding to a second CDE after the respective CDEs have been applied to the information. Examples of CDEs may include CDMA sequences, LDS signatures, SCMA codebooks, and the like.

The configuration of the SSFTx zone(s) may be provided by the eNB to the UE over a slow signaling channel or a very slow signaling channel, such as through higher layer signaling (e.g., radio resource control (RRC) signaling). The configuration of the SSFTx zone(s) may be changed by the eNB on occasion to meet changes in traffic demand, communications system condition, UE load, number of UEs, UE traffic pattern, and the like. Through the configuration of the SSFTx zone(s), the UE know the number of CDEs per SSFTx zone, the number of SSFTx zone(s), the location of the SSFTx zone(s) (i.e., the resources associated with the SSFTx zone(s), and the like. It is noted that the use of a slow signaling channel or a very slow signaling channel allows for very low overhead resource management.

According to an example embodiment, a plurality of UEs may be assigned to each SSFTx zone. Furthermore, a single UE may be assigned to multiple SSFTx zones. The assignment of UE to SSFTx zone(s) may be made in consideration of assignment criteria, such as UE priority, UE type, UE subscription level, UE traffic type, UE traffic priority, UE traffic pattern, UE service history, and the like.

Figure 5:
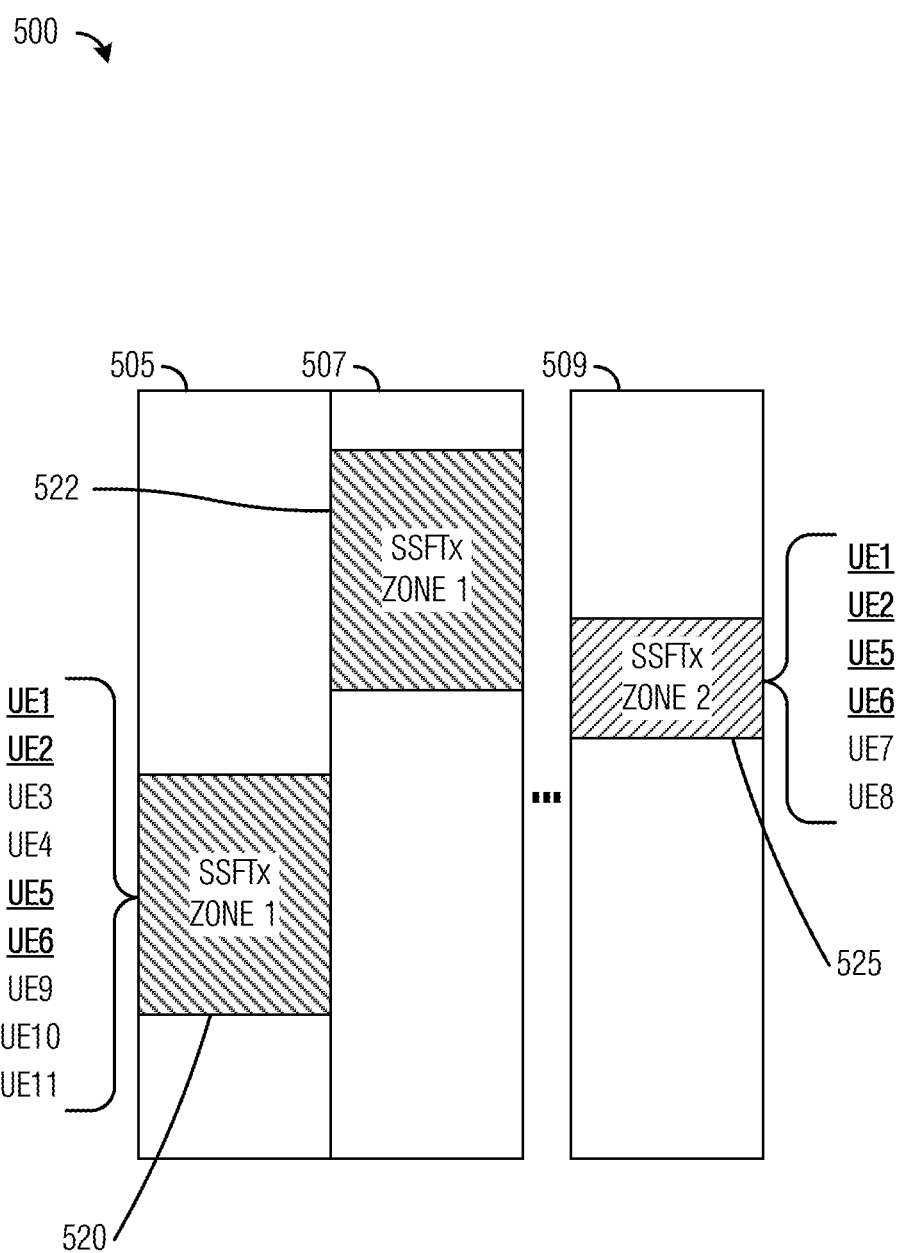
FIG. 5 illustrates a detailed view of an example frame, highlighting an example assignment of UE to SSFTx zones according to example embodiments described herein.

FIG. 5 illustrates a detailed view of a frame 500, highlighting an example assignment of UE to SSFTx zones. As shown in FIG. 5, frame 500 includes at least M TTIs (e.g., TTI 1 505, TTI 2 507, and TTI M 509) and two SSFTx zones (SSFTx zone 1 that is present in TTI 1 505 (block 520) and TTI 2 507 (block 522) and SSFTx zone 2 that is present in TTI M 509 (block 525)). SSFTx zone 1 may have 9 assigned UE, including UE1, UE2, UE3, UE4, UE5, UE6, UE9, UE10, and UE11, while SSFTx zone 2 may have 6 assigned UE, including UE1, UE2, UE5, UE6, UE7, and UE8. It is noted that some UE are assigned to both SSFTx zones, including UE1, UE2, UE5, and UE6, while UE3, UE4, UE9, UE10, and UE11 are assigned only to SSFTx zone 1 and UE7 and UE8 are assigned only to SSFTx zone 2.

It is noted that although a UE may be assigned to one or more SSFTx zones, the UE may or may not be allocated resources necessary to receive a transmission. As an illustrative example, a UE may not be allocated resources to receive a transmission if the eNB does not have any data to transmit to the UE, if the eNB has not received a transmission request from the UE, if the eNB has not selected the UE to allocate resource to even if the eNB has data to transmit to the UE, and the like.

Figure 6A:
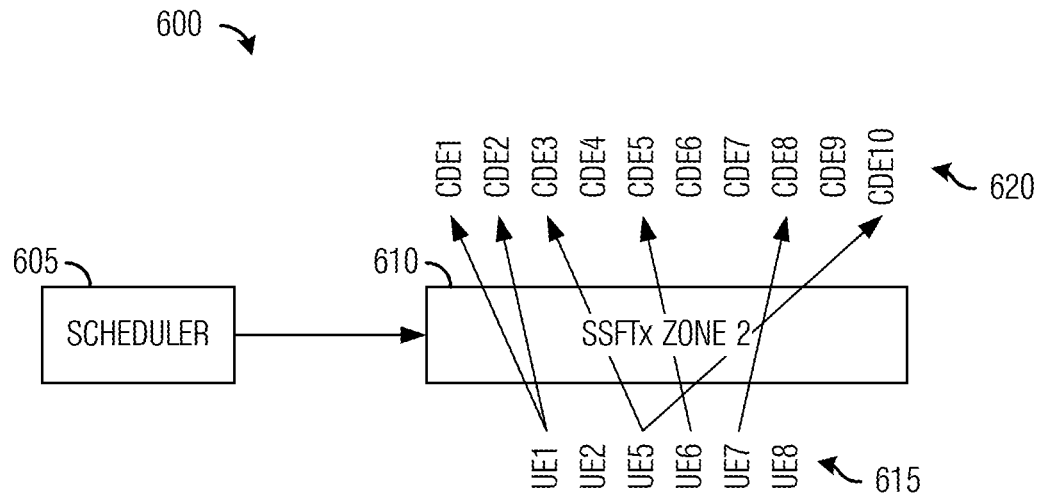
FIG. 6a illustrates an example diagram of a system for assigning resources to UE according to example embodiments described herein.

FIG. 6a illustrates a diagram of a system 600 for assigning resources to UE. System 600 may be representative of a portion of an eNB of a communications system supporting communications without dynamic control signaling. System 600 may include a scheduler 605. Scheduler 605 may be used determine which UE out of a set of UEs assigned to a SSFTx zone that has data to transmit to. As an illustrative example, for SSFTx zone 2 610, the set of UEs assigned to SSFTx zone 2 610 comprises 6 UEs. However, for only 4 out of the 10 UEs does the eNB have data to transmit to.

For discussion purposes, consider a situation where the eNB has data to transmit to UE1, UE5, UE6, and UE7. Scheduler 605 may then select an assignment of one or more CDEs to each UE. It is noted that each UE may be assigned one or more CDEs, but one CDE may be assigned to only one UE. As shown in FIG. 6a, UE1 is assigned CDE1 and CDE2, UE5 is assigned CDE3 and CDE10, while UE6 is assigned CDE5 and UE7 is assigned CDE8. It is noted that the number of CDEs assigned to a UE may depend upon the amount of data to be transmitted to the UE, the number of CDEs available for assigning, the number of UE to assign CDEs to, the amount of data to be transmitted to the UEs, and the like.

It is noted that the UEs are unaware of the UE to CDE assignments and may use blind detection to determine whether a CDE is transmitted or not, and if transmitted whether it carries the UE's data or data of other UEs. As an example, a blind LDS and/or SCMA signature detector may be used by UEs to determine the list of the active CDEs within a SSFTx zone. It is also noted that the CDEs to which the UEs are assigned are logical CDEs which may be representative of a set of physical CDEs. A mapping rule used to map logical CDEs to physical CDEs may be pre-defined and known by BS and UEs.

Figure 6B:
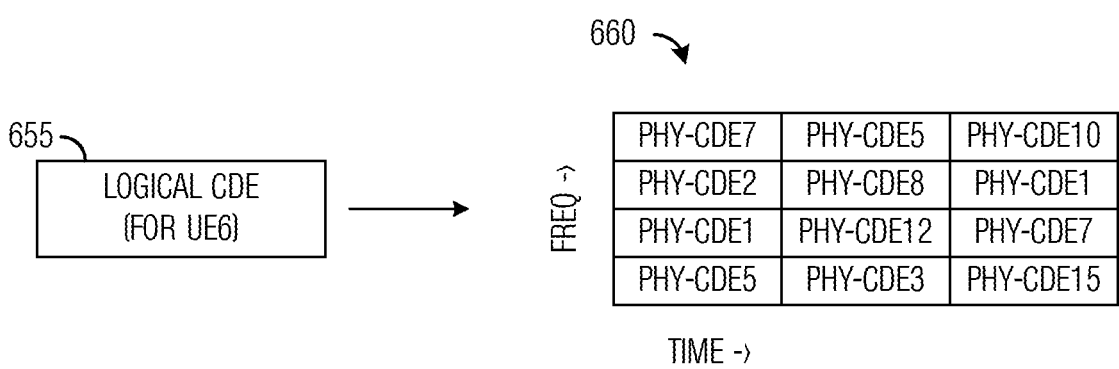
FIG. 6b illustrates an example relationship between logical CDEs and physical CDEs according to example embodiments described herein.

FIG. 6b illustrates a relationship between logical CDEs and physical CDEs. As shown in FIG. 6b, a logical CDE 655 that is assigned to UE6 is mapped to physical CDEs 660. As discussed in FIG. 6a, CDE5 is assigned to UE6.

Figure 7A:
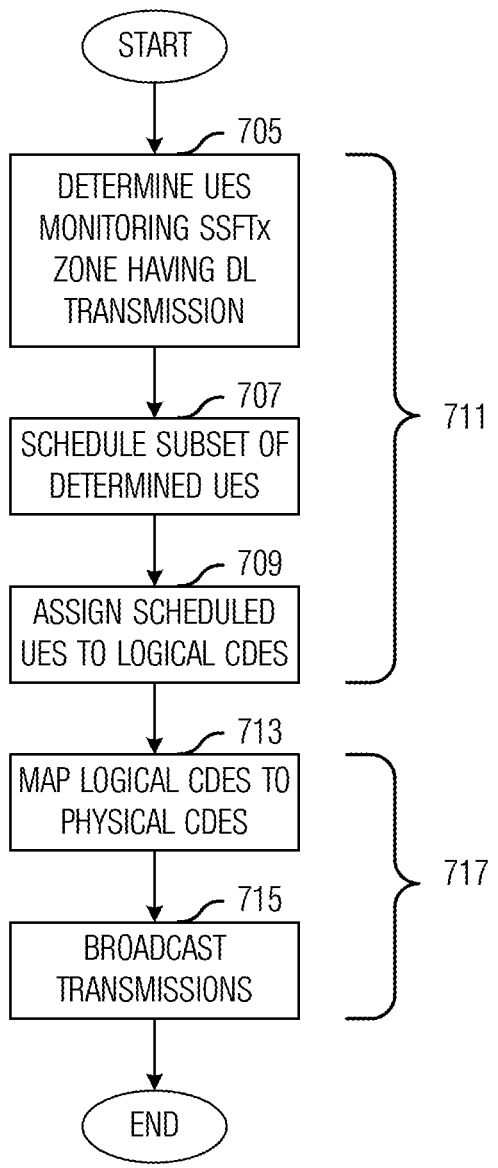
FIG. 7a illustrates an example flow diagram of operations occurring in an eNB as the eNB transmits to UEs in a communications system supporting communications without dynamic control signaling according to example embodiments described herein.

FIG. 7a illustrates a flow diagram of operations 700 occurring in an eNB as the eNB transmits to UEs in a communications system supporting communications without dynamic control signaling. Operations 700 may be indicative of operations occurring in an eNB, such as eNB 105, as the eNB transmits to UEs using communications without dynamic control signaling.

Operations 700 may begin with the eNB determine which UEs served by the eNB have data to transmit to, i.e., which UEs have downlink transmissions (block 705). In general, a UE may have downlink transmissions if the eNB has data intended for the UE stored in memory or a buffer. Alternatively, the UE may have downlink transmissions if the eNB expects to have data intended for the UE in memory or a buffer by the time that the eNB is to make downlink transmissions. Typically, the UEs having downlink transmissions is a subset of the UEs served by the eNB.

The eNB may schedule a subset of the UEs with downlink transmissions, thereby producing scheduled UE(s) (block 707). Scheduling may involve selecting some or all of the UEs with downlink transmissions (or having a downlink transmission available) in accordance with scheduling criteria, which may include UE priority, UE service history, data priority, available resources, amount of data to transmit, and the like, for available transmission opportunities or transmission intervals. As an illustrative example, consider a situation where the eNB has a total of 10 UEs with downlink transmissions, but only has a total of 5 resources to allocate to the downlink transmissions. The eNB may use a variety of scheduling algorithms, including those that target proportional fairness, maximize data throughput, minimize latency, and the like, to select a subset of the 10 UEs to assign the 5 resources to. Discussion of the actual scheduling techniques is beyond the scope of the present embodiments.

The eNB may assign the scheduled UE(s) to logical CDEs (block 709). As discussed above, scheduling UEs may involve selecting UEs to which resources (e.g., logical CDEs) are to be assigned. The eNB may assign one or more logical CDE of the transmission zone to each of the scheduled UE(s) in accordance to the scheduling performed by the eNB. As an illustrative example, if the scheduling selected three UEs and specified that each was to be assigned a single logical CDE, the eNB may assign a single logical CDE to each of the three UEs. Typically, the assignment of the logical CDEs to the UEs may be arbitrary. However, it may be possible that some of the logical CDEs are more separated in the code domain than others and these logical CDEs may be assigned preferentially.

Collectively, determining the UEs with downlink transmissions 705, scheduling the UEs with downlink transmissions 707, and assigning the scheduled UE(s) 709 may be referred to as resource assignment for communications without control signaling (blocks 711). The eNB may map the logical CDEs to physical CDEs (block 713). As a reference, an example relationship between a logical CDE and physical CDEs is presented in FIG. 6b. In general, mapping logical CDEs to physical CDEs indicate network resources correspond to each of the logical CDEs.

The eNB may broadcast the transmissions (block 715). Broadcasting the transmissions may involve the eNB applying the codes associated with the logical CDEs to the data of the downlink transmissions, precoding, amplifying, modulating, filtering, and the like, to the data to produce a transmission signal and then providing the transmission signal to a transmit antenna(s) to send the transmission signal over the air to the UEs. Collectively, mapping logical CDEs 713 and broadcasting transmissions 715 may be referred to as transmitting data without dynamic control signaling (blocks 717).

Figure 7B:
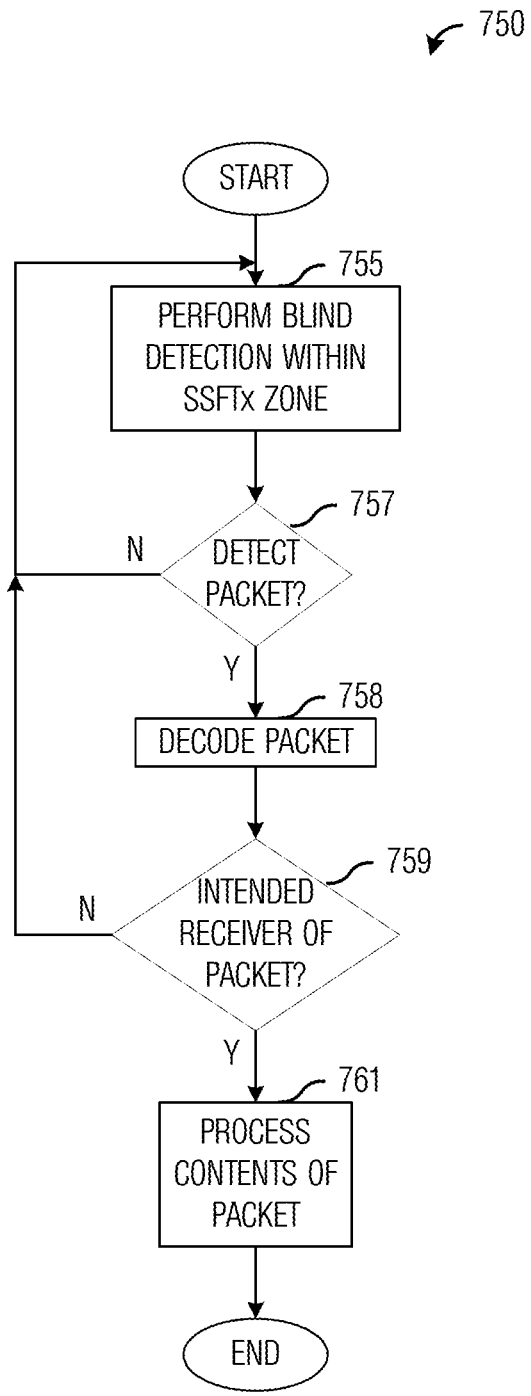
FIG. 7b illustrates an example flow diagram of operations occurring in a UE as the UE receives a transmission from an eNB in a communications system supporting communications without dynamic control signaling according to example embodiments described herein.

FIG. 7b illustrates a flow diagram of operations 750 occurring in a UE as the UE receives a transmission from an eNB in a communications system supporting communications without dynamic control signaling. Operations 750 may be indicative of operations occurring at a UE, such as UEs 110-116, as the UE receives a transmission from an eNB without dynamic control signaling.

Operations 750 may begin with the UE detecting within an SSFTx zone for a packet (block 755). According to an example embodiment, the UE may utilize blind detection to find packets within the SSFTx zone. Generally, blind detection involves applying different hypotheses and/or signatures to RBs within the SSFTx zone to the presence of packets. As an illustrative example, the eNB may utilize spreading codes from a CDMA code book, signatures from a LDS codebook, codes from a SCMA codebook, and the like, associated with CDEs of the SSFTx zone to transmit packets in a SSFTx zone. In general, the CDEs orthogonize or substantially orthogonize the packets in the SSFTx zone.

Figure 8A:
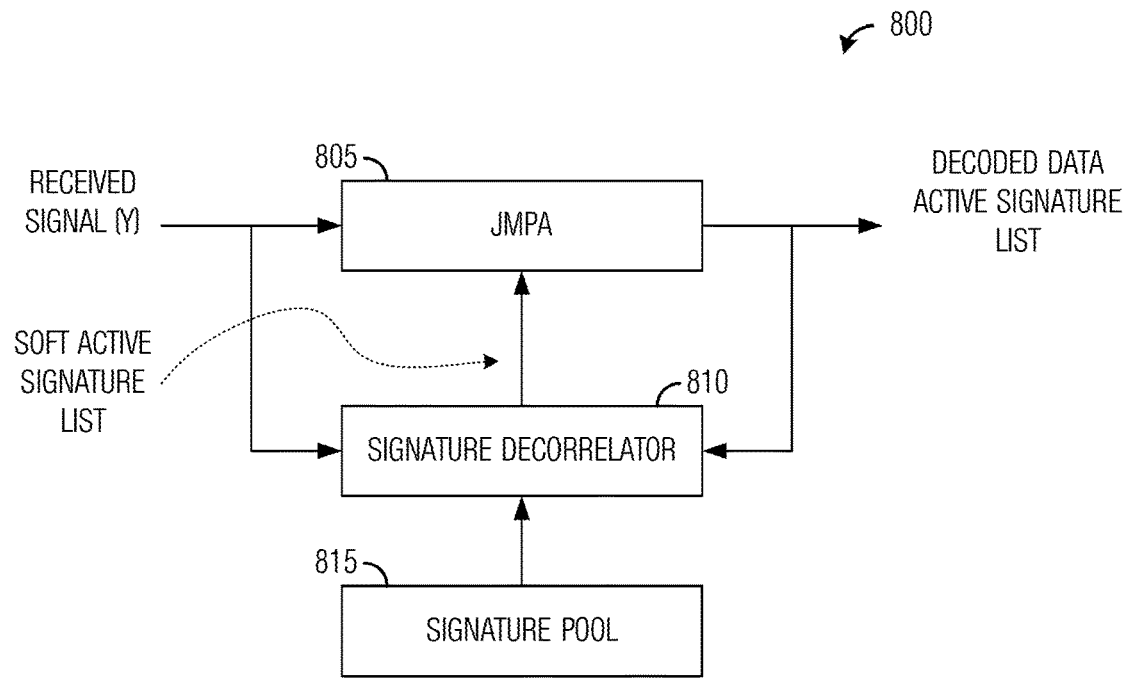
FIG. 8a illustrates an example first example blind detector capable of receiving packets within the SSFTx zone according to example embodiments described herein.

FIG. 8a illustrates a first example blind detector 800 capable of receiving packets within the SSFTx zone. Blind detector 800 includes a joint signature and data detection with message passing algorithm (JMPA) detector 805. A signature decorrelator 810 provides a soft list of signatures (e.g., spreading codes from a CDMA code book, signatures from a LDS codebook, codes from a SCMA codebook, and the like). Signature pool 815 includes the spreading codes from a CDMA code book, signatures from a LDS codebook, codes from a SCMA codebook, and the like. Using the soft list of signatures and a received signal, JMPA detector 805 jointly detects the transmitted data and active signatures (or in general, CDEs). Soft output of blind detector 800 may be used as a priori information to update the soft list of signatures (CDEs).

Figure 8B:
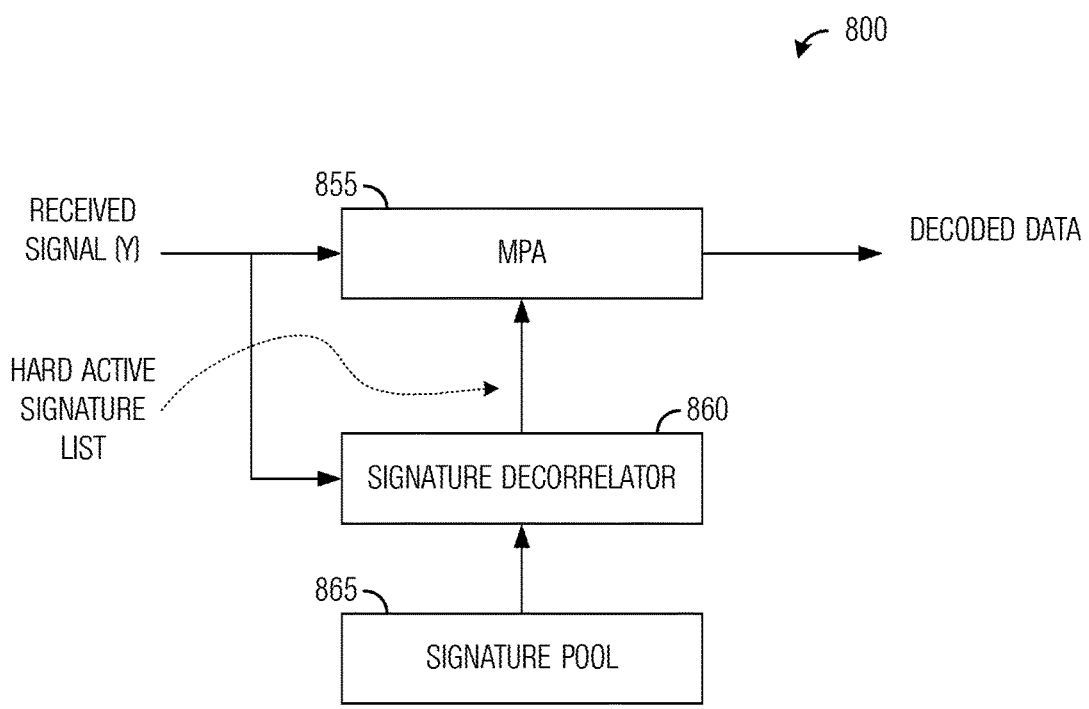
FIG. 8b illustrates an example second example blind detector capable of receiving packets within the SSFTx zone according to example embodiments described herein.

FIG. 8b illustrates a second example blind detector 850 capable of receiving packets within the SSFTx zone. Blind detector 850 may provide reduced complexity in the blind detection process since in the downlink, a transmitter knows the number of active signatures and use them in a predetermined order. The order of the usage of the signatures may be provided to the UE (and blind detector 850). Knowledge of the order of usage may help to simplify and improve the search for the active signatures (CDEs). Additionally, with a transmit power constraint the power of each active signature may be scaled by a total number of active signatures in the case of no power offset between signatures. Blind detector 850 features a decorrelator with hard detection. Signature decorellator 860 provides a list of active signatures for message passing algorithm (MPA) detection by a MPA detector 855. MPA detector 855 may try to detect data over the active signatures with an assumption that the hard list provided by signature decorellator 860 is correct. A signature pool 865 includes the spreading codes from a CDMA code book, signatures from a LDS codebook, codes from a SCMA codebook, and the like.

Referring back to FIG. 7b, the UE may perform a check to determine if it has found a packet within the SSFTx zone (block 757). As an illustrative example, an output of a blind detector may assert a signal or an interrupt to indicate that it has found a packet. The UE may check if such a signal or interrupt has been asserted. If the blind detector has not found a packet, the UE may return to block 755 to continue searching for packets within the SSFTx zone.

If the blind detector has found the packet, the UE may decode the packet (block 758). The UE may decode the packet in accordance with an MCS level specified by the eNB. The MCS level may have been signaled to the UE using a slow signaling channel or a very slow signaling channel.

If the UE is able to decode the packet, the UE may perform another check to determine if it is the intended receiver of the packet (block 759). According to an example embodiment, the packet may be marked with its intended recipient. As an illustrative example, a portion of the packet, such as its cyclic redundancy check (CRC) may be masked with identifying information (e.g., an identifier of the intended recipient) of the intended recipient. As another illustrative example, a portion of the packet, such as a header of the packet, may include the identifying information of the intended recipient. If the UE is not the intended recipient of the packet, the UE may return to block 755 to continue searching for packets within the SSFTx zone. It is noted that determining if the packet is the intended receiver of the packet may include decoding the packet.

If the UE is the intended recipient of the packet, the UE may process the packet and its content (block 761). As illustrative examples, processing of the packet may include operating responsive to the content of the packet. As an illustrative example, if the packet includes control information, the UE may adjust its configuration responsive to the control information contained in the packet. As another illustrative example, if the packet includes data, the UE may provide the data to an application to make use of the data, store the data, and the like. It is noted that if the UE has not completed its detection of the SSFTx zone, it may return to block 755 to continue detecting the SSFTx zone.

In general, the quality of a communications link, such as a LDS link, may depend on a number of parameters, including:
  A modulation and coding scheme (MCS) level of co-paired users;
  An allocated power to each layer for a given transmit power constraint; and
  A number of co-paired users.

Typically, each of the parameters (or a combination thereof) may be used to adaptively change the quality of the communications link. However, some may be amenable to blind link adaptation with no signaling cost.

According to an example embodiment, it may be possible to fix the MCS on a per SSFTx zone basis. In such a situation, the MCS of each SSFTx zone may be configured using a slow signaling channel or a very slow signaling channel, such as through higher layer signaling. UEs assigned to a SSFTx zone use the same MCS regardless of its channel condition, i.e., channel quality. The eNB may set up multiple SSFTx zones with different MCS levels and the UEs may be assigned to an appropriate SSFTx zone depending on their condition, such as channel quality.

FIG. 9a illustrates a flow diagram of operations 900 occurring in an eNB as the eNB configures an SSFTx zone with a fixed MCS level. Operations 900 may be indicative of operations in an eNB, such as eNB 105, as the eNB configures an SSFTx zone with a fixed MCS level.

Operations 900 may begin with the eNB configuring the MCS level (block 905). It is noted that setting the MCS level for an SSFTx zone may occur in several different ways. As an illustrative example, the MCS level of all UEs in the SSFTx zone may be set to the same level. As an example, the eNB may configure a plurality of SSFTx zones with a different MCS level in each SSFTx zone and then assign UEs to appropriate SSFTx zone(s) in accordance with their channel condition. As another illustrative example, the MCS level may be set on an individual basis for each of the UEs in the SSFTx zone. It is noted that in the situation where the MCS level is set on an individual basis, the MCS level of more than one UE may be set to the same value. The eNB may configure the MCS level by transmitting control information on a slow signaling channel or a very slow signaling channel, such by using higher layer messaging (e.g., RRC messaging).

FIG. 9b illustrates a flow diagram of operations 950 occurring in a UE as the UE configures its decoder in accordance with a fixed MCS level. Operations 950 may be indicative of operations in a UE, such as UEs 110-116, as the UE configures its decoder in accordance with a fixed MCS level.

Operations 950 may begin with the UE receiving control signaling about a MCS level of transmissions to the UE (block 955). The control signaling may be sent to the UE by an eNB serving the UE. The control signaling may be received on a slow signaling channel or a very slow signaling channel. The control signaling may indicate a modulation scheme and/or a code rate of transmissions to the UE. It is noted that if the UE is receiving transmissions from multiple sources, the different transmissions may have different MCS levels. The UE may configure its receiver to detect and/or decode transmissions having the specified MCS level (block 960).

According to an example embodiment, if the MCS level of transmissions to all UEs of a single SSFTx zone is fixed, then control signaling of the MCS level may be significantly reduced since the UE may be able to infer the MCS level in accordance with identification information of the SSFTx zone, such as SSFTx zone number. Control signaling may only be needed in situations such as when the MCS level is changed.

According to another example embodiment, it may be possible to fix the modulation level used in communications to a single UE operating within an SSFTx zone, however, the coding rate of the transmissions may be changed adaptively, e.g., to meet the channel condition of the UE. The modulation level may be fixed after being configured using a slow signaling channel or a very slow signaling channel, such as with higher layer signaling. The code rate may be changed, e.g., slowly changed, according to the channel condition of the UE as reported by the UE. The channel condition may be in the form of long-term channel state information, e.g., downlink geometry, reported by the UE or measured by the eNB using channel reciprocity. The adaptive code rate adds flexibility in that the eNB may apply long-term link adaptation at the cost of slow signaling support.

The UE may perform blind detection to determine the code rate of the transmissions. To further simplify the blind detection, the code rate of the transmissions may be selected from a set of possible code rates, which would reduce the search space of the blind detection. The set of possible code rates may be predefined by the eNB, operator of the communications system, a technical standard, and the like, and provide to the UE. The set of possible code rates may be provided to the UE when it initially attaches to the communications system or in messages transmitted or broadcast by the eNB.

The channel condition may be of the long-term variety, allowing for the use of slow signaling channels or very slow signaling channels to synchronize the channel condition at the eNB and the UE. The UE may measure its channel condition and report it to the eNB or the eNB may measure the channel condition of the UE using channel reciprocity and uplink transmissions made by the UE.

According to the example embodiment, the eNB may define a rule that is used to map channel condition to coding rate. The rule may be provided to the UE so that the UE is also able to determine the coding rate in accordance with the channel condition. Since both the eNB and the UE know the rule, the coding rate may not need to be signaled to the UE. Instead, the UE, using the same rule as the eNB, may determine the coding rate from the channel condition (which it provided to the eNB or received from the eNB). According to an alternative example embodiment, since the code rate changes slow in accordance with the channel condition, the code rate may be signaled to the UE using a slow signaling channel or a very slow signaling channel.

Figures 10A, 10B:
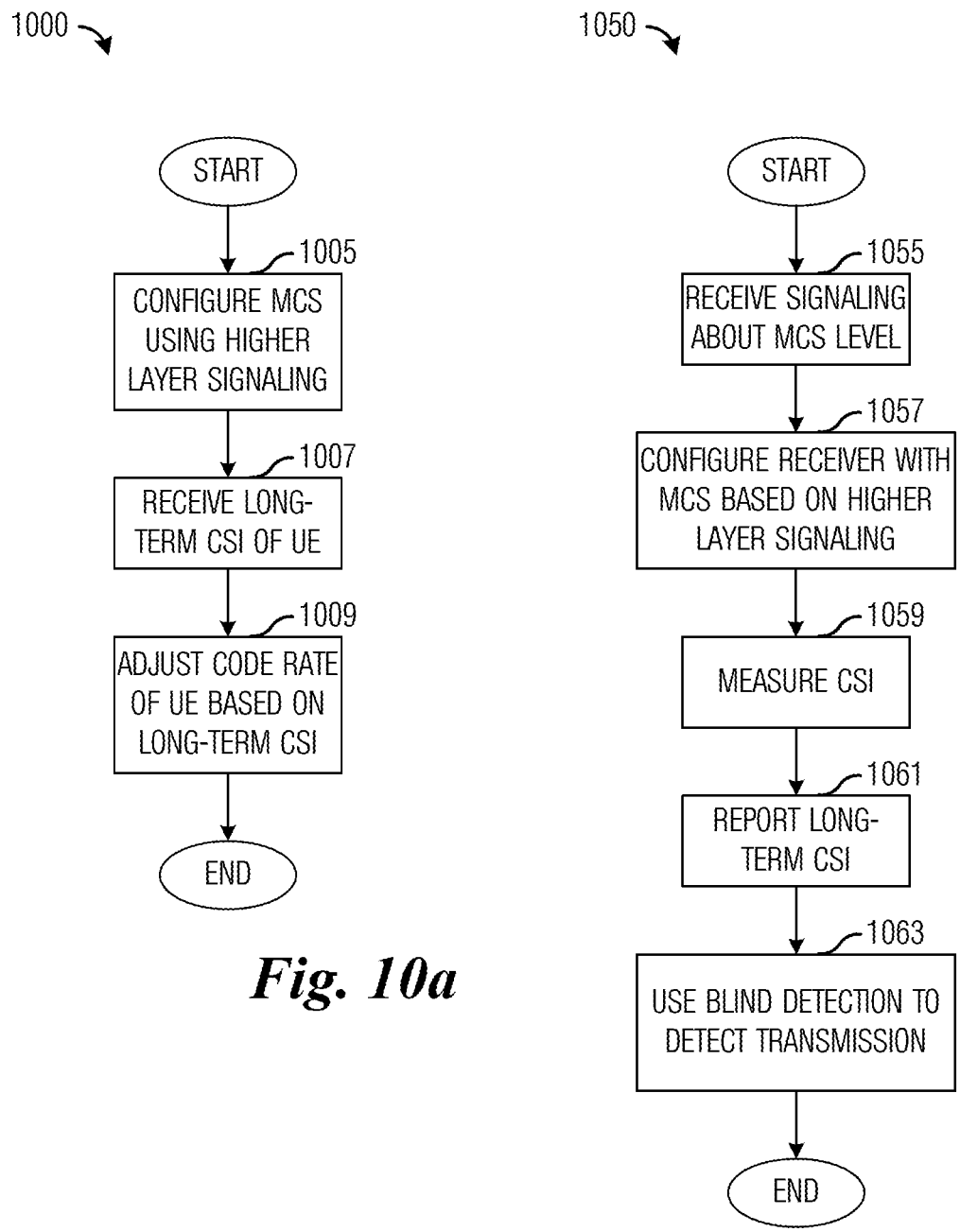
FIG. 10a illustrates an example flow diagram of operations occurring in an eNB as the eNB adjusts a code rate of transmissions to a UE operating in an SSFTx zone according to example embodiments described herein.
FIG. 10b illustrates an example flow diagram of operations occurring in a UE as the UE receives a transmission with an adaptive code rate that is set in accordance with a channel condition of the UE according to example embodiments described herein.

FIG. 10a illustrates a flow diagram of operations 1000 occurring in an eNB as the eNB adjusts a code rate of transmissions to a UE operating in an SSFTx zone. Operations 1000 may be indicative of operations in an eNB, such as eNB 105, as the eNB adjusts a code rate of transmissions to a UE operating in an SSFTx zone.

Operations 1000 may begin with the eNB configuring the MCS level (block 1005). The eNB may configure the MCS level of the SSFTx zone or of UEs in the SSFTx zone by transmitting control information on a slow signaling channel or a very slow signaling channel, such by using higher layer messaging (e.g., RRC messaging). The eNB may receive long-term CSI from a UE (block 1007). As an example, the UE may provide the eNB with long-term CSI (e.g., channel geometry of a channel between the eNB and the UE). The long-term CSI provided by the UE may be provided using a slow signaling channel or a very slow signaling channel. Alternatively, instead of receiving the long-term CSI from the UE, the eNB may make a measurement of the channel between the eNB and the UE using transmissions made by the UE to make the measurement and use the measurement as the long-term CSI. The eNB may make and use multiple measurements of transmissions made by the UE. It is noted that if the eNB is making the long-term CSI measurements, the eNB may signal the long-term CSI to the UE using a slow signaling channel or a very slow signaling channel. Alternatively, the UE may make its own long-term CSI measurements, negating a need for the eNB to signal the long-term CSI.

The eNB may adjust the code rate of a transmission to the UE in accordance with the long-term CSI (block 1009). As an example, if the long-term CSI indicates that the channel quality is high, the eNB may raise the code rate to increase the amount of data that it can transmit to the UE, while if the channel quality is low, the eNB may lower the code rate to improve the probability that the UE will be able to decode the transmission that it receives. A mapping rule may be used to set the code rate based on the long-term CSI. The mapping rule may be specified by the eNB, a technical standard, an operator of the communications system, and the like. It is noted that the mapping rule may also be provided to the UE, therefore, the UE may also know the code rate that the eNB is going to use since it reported the long-term CSI.

FIG. 10b illustrates a flow diagram of operations 1050 occurring in a UE as the UE receives a transmission with an adaptive code rate that is set in accordance with a channel condition of the UE. Operations 1050 may be indicative of operations occurring at a UE, such as UE 110-116, as the UE receives a transmission with an adaptive code rate that is set in accordance with a channel condition of the UE.

Operations 1050 may begin with the UE receiving control signaling about a MCS level of transmissions to the UE (block 1055). The control signaling may be sent to the UE by an eNB serving the UE. The control signaling may be received on a slow signaling channel or a very slow signaling channel. The control signaling may indicate a modulation scheme and/or a code rate of transmissions to the UE from the UE. The UE may configure its receiver to detect and/or decode transmissions having the specified MCS level (block 1057).

The UE may measure CSI of a communications channel between the eNB and the UE (block 1059). The CSI may be measured using special sequences, such as pilot sequences, reference sequences, and the like, transmitted by the eNB. The UE may use the measured CSI to generate long-term CSI, such as channel geometry, for the channel. The UE may report the long-term CSI to the eNB (block 1061). Since the UE is reporting long-term CSI, the UE may not need to report frequently, so a slow signaling channel or very slow signaling channel is sufficient.

The UE may use blind detection to detect a transmission (block 1063). The blind detection may utilize a code rate determined in accordance with the long-term CSI reported by the UE. Since the UE knows a mapping rule used by the eNB to set the code rate of transmissions for the UE, the UE may be able to determine the code rate used in the transmission. It is noted that since the eNB may or may not receive the long-term CSI report or it may or may not adjust the code rate based on the long-term CSI, the code rate determined in accordance with the long-term CSI may be used as one of several possible transmission code rates.

In a scenario where the eNB measures the CSI and/or long-term CSI of the channel between the UE and the eNB, the UE may not necessarily need to report the long-term CSI (e.g., block 1061). However, the UE may still make use of the long-term CSI that it measure to obtain a possible code rate of transmissions made by the eNB to the UE.

As discussed previously, the performance of LDS may be dependent on a number of overlaid users (i.e., UEs). In LDS, the signal to noise ratio (SNR) is defined as the total received signal power to noise power at a UE. Hence, the smaller the number of multiplexed UEs, the better the expected performance for a given received SNR. Consequently, the number of co-paired UEs may be used as a flexible tool for the eNB to control link-adaptation without requiring signaling support. As long as a UE is capable of blindly detecting the number of active signatures, the communications system is functional and at the same time, adaptive link quality control is possible.

Generally, the number of co-paired UEs is determined by the scheduler at the eNB. Also, the transmit power spectrum is equally allocated to the co-paired UEs. Therefore, there is little or no power offset among active signatures. Therefore, when the number of co-paired UEs is reduced by the schedule, benefits arise in terms of link quality. The benefits include increased transmit power per UE, and a reduction in the number of overlaid signatures results in improved MPA detection performance. If a long-term CSI indicator regarding UEs is available to the eNB, the scheduler can determine the number of co-paired UEs depending on their CSI.

It may be possible that in a given scheduling interval, the number of co-paired UEs (and hence, the number of co-paired CDEs) may be determined by a scheduler to control the link quality. In general, the link quality may change depending on the number of co-paired CDEs. The number of co-paired CDEs may impact the link quality in a number of ways, including:

- The allocated transmit power per UE changes with the number of co-paired CDEs (co-paired UEs). As an example, if the total transmit power is equally split among N co-paired CDEs, then each CDE receives 1/N of the total transmit power; and
- The detection performance may improve if the number of co-paired CDEs is reduced since the level of cross-CDE interference is reduced.

As an illustrative example, the transmit power may be equally allocated to the co-paired CDEs. If there is a power offset between the CDEs, then a blind mechanism may be used by UEs to determine the power offset pattern for blind detection purposes. It is noted that the total transmit power within a SSFTx zone may be set by a technical standards, an operator of the communications system, and the like, and provided to the UEs. It is also noted that the pilots of the SSFTx zone may be scaled according to the total transmit power spectrum of the data (e.g., data tones). The use of scaled pilots does not require the signaling of the total transmit power to the UEs.

FIG. 11a illustrates a flow diagram of operations 1100 occurring in an eNB as the eNB adjusts a transmit power level of transmissions to UEs operating in an SSFTx zone. Operations 1100 may be indicative of operations in an eNB, such as eNB 105, as the eNB adjusts a transmit power level of transmissions to UEs operating in an SSFTx zone.

Operations 1100 may begin with the eNB configuring the MCS level (block 1105). The eNB may configure the MCS level of the SSFTx zone or of UEs in the SSFTx zone by transmitting control information on a slow signaling channel or a very slow signaling channel, such by using higher layer messaging (e.g., RRC messaging). The eNB may schedule UEs (block 1107). As discussed previously, the eNB knows the UEs scheduled, including the number of co-paired UEs for LDS operation. The eNB may adjust the transmit power level of all scheduled UEs in accordance with the number of scheduled UEs (block 1109). As an illustrative example, if there are N co-paired UEs, then the eNB may adjust the transmit power level of transmissions to each UE to be equal to a total transmit power level*1/N. The eNB may transmit to the scheduled UEs (block 1111).

FIG. 11b illustrates a flow diagram of operations 1150 occurring in a UE as the UE receives a transmission wherein the transmit power level of the transmission is adaptable by an eNB. Operations 1150 may be indicative of operations in a UE, such as UEs 110-116, as the UE receives a transmission where the transmit power level of the transmission is adaptable by an eNB.

Operations 1150 may begin with the UE receiving control signaling about a MCS level of transmissions to the UE (block 1155). The control signaling may be sent to the UE by an eNB serving the UE. The control signaling may be received on a slow signaling channel or a very slow signaling channel. The control signaling may indicate a modulation scheme and/or a code rate of transmissions to the UE. The UE may configure its receiver to detect and/or decode transmissions having the specified MCS level (block 1157).

The UE may use blind detection to detect a transmission (block 1159). The blind detection may make use of the MCS configuration signaled by the eNB, as well as other parameters to detect the transmission. If the UE detects the transmission and if it is the intended recipient of the transmission, the UE may process the contents of the packet (block 1161).

Figure 11C:
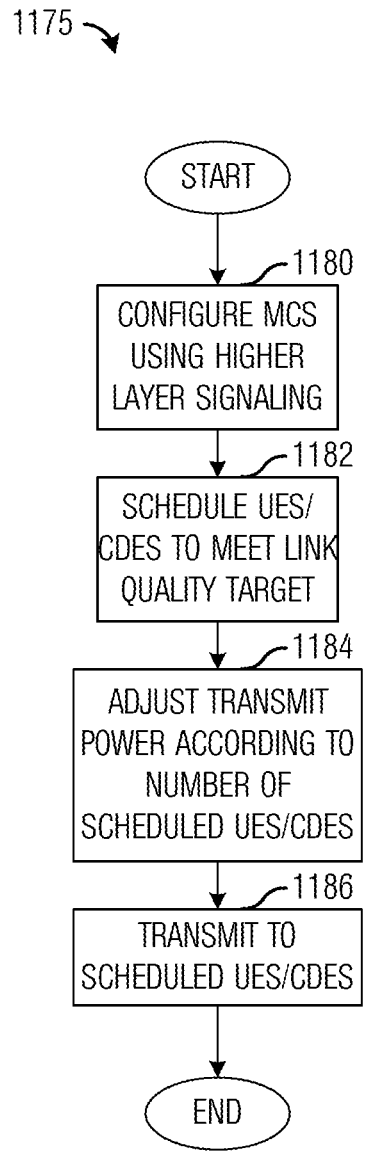
FIG. 11c illustrates an example flow diagram of operations occurring in an eNB as the eNB adjusts a number of co-paired UEs (CDEs) to meet a target link quality according to example embodiments described herein.

FIG. 11c illustrates a flow diagram of operations 1175 occurring in an eNB as the eNB adjusts a number of co-paired UEs (CDEs) to meet a target link quality. Operations 1175 may be indicative of operations in an eNB, such as eNB 105, as the eNB adjusts a number of co-paired UEs (CDEs) to meet a target link quality in a SSFTx zone.

Operations 1175 may begin with the eNB configuring the MCS level (block 1180). The eNB may configure the MCS level of the SSFTx zone or of UEs in the SSFTx zone by transmitting control information on a slow signaling channel or a very slow signaling channel, such by using higher layer messaging (e.g., RRC messaging). The eNB may schedule UEs (CDEs) to meet a target link quality (block 1182). It is noted that in this scenario, scheduling the UEs also includes assigning the CDEs to the UEs. As discussed previously, the number of scheduled UEs (CDEs) or similarly, overlaid signatures, may have an impact on the link quality. As an example, the number of scheduled UEs has an impact on the allocated transmit power level of transmissions to the scheduled UEs since larger numbers of scheduled UEs generally implies lower transmit power levels. As another example, the number of scheduled UEs also has an impact on detection performance since larger numbers of scheduled UEs generally implies greater cross interference. Therefore, to meet the target link quality, the eNB may schedule a certain number of UEs even if additional resources are available, for example. The eNB may adjust the transmit power level of transmissions to the scheduled UEs in accordance with the number of scheduled UEs (block 1184). As an illustrative example, the eNB scheduled 8 UEs, then the transmit power level may be ⅛ that of the transmit power level if the eNB scheduled a single UE. The eNB may transmit to the scheduled UEs (block 1186).

HARQ is a technique used in error detection and error correction in communications systems. Typically, a receiver attempts to decode a received transmission and if it is able to successfully decode the received transmission, the receiver sends a positive acknowledgement (ACK) to the transmission's sender. If the receiver is not able to successfully decode the received transmission, the receiver sends a negative acknowledgement (NACK) to the transmission's sender. At the sender, if an ACK is received, the sender considers the transmission successfully sent. However, if it receives a NACK or if no ACK or NACK is received within a specified time, the sender resends the transmission. The sender may continue to resend the transmission until it receives an ACK or it has resent the transmission a maximum specified number of times. Typical HARQ techniques also involve control signaling, which can negatively impact performance.

What is needed is a HARQ technique that is blind and does not require dynamic control signaling. The blind HARQ technique features the following:

No dynamic control signaling is required;
Synchronous operation;
Uses Chase combining to help improve decoding performance;
Transmissions and retransmissions associated with a packet are mapped to the same logical CDE(s);
Each transport block (TB) is mapped to one forward error correcting code (FEC) and one logical CDE;
UEs are not aware if it has been scheduled, and if a detected transmission is a first transmission or a retransmission (in other words, the UE does not know when the HARQ process starts);
UEs do not know their allocated logical CDE(s);
UEs do not transmit NACKs;
FEC CRCs are masked with a UE specific identifier or a MAC header of a transmission includes the UE specific identifier; and
The HARQ technique is completely blind.

In an initial transmission, an eNB may assign a logical CDE to the UE, map the logical CDE to a set of physical CDEs based on a predefined rule, transmit the initial transmission as discussed previously. The UE is not aware if it has been scheduled or not. The CRC of the FEC block may be masked by a UE specific identifier or the MAC header may contain the UE specific identifier to allow the UE to determine the intended recipient of the transmission. The UE operates as described previously to detect the transmission, determine if it is the intended recipient of the transmission, and decode the transmission. In other words, the operations occurring at the eNB and at the UE for the initial transmission are as described.

Figure 12:
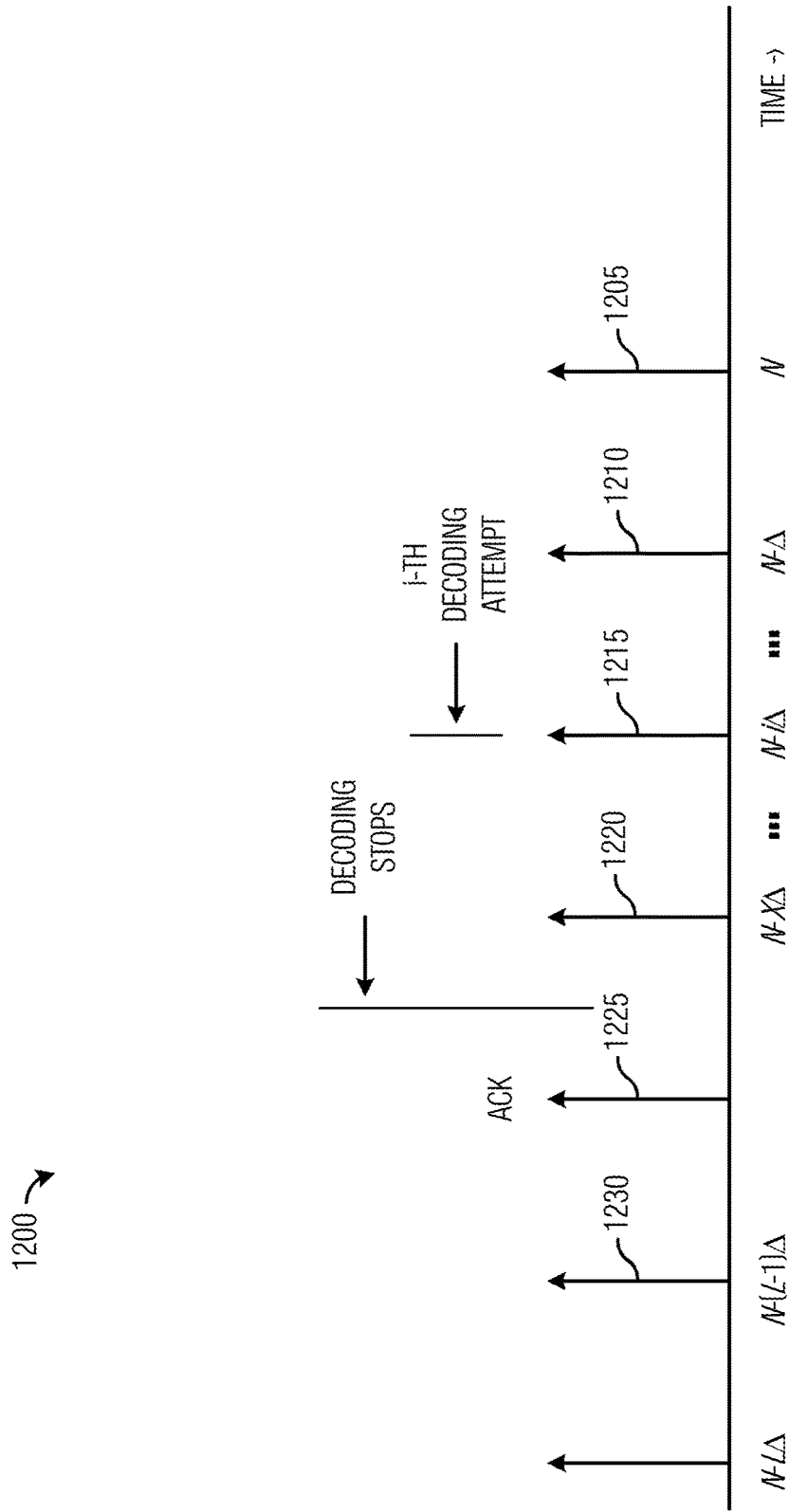
FIG. 12 illustrates an example timing diagram where HARQ operation is highlighted according to example embodiments described herein.

FIG. 12 illustrates a timing diagram 1200 where HARQ operation is highlighted. In practice, the initial transmission may fail. Therefore, HARQ retransmission may be required. For discussion purposes, consider a situation where L is the maximum number of HARQ transmissions (it is noted that L includes the initial transmission), $\Delta$ is the retransmission interval, and i is an integer value. At time N (as indicated by arrow 1205), an initial transmission is made. Assume that the UE is unable to successfully decode the initial transmission.

The UE may initiate HARQ reception operations to recover the initial transmission. Since the UE does not know if the initial transmission is actually a first transmission or one of up to L transmissions associated with a single transmission, the UE may need to perform multiple decoding attempts. The UE may access up to L-1 instances of buffered data corresponding to the one or more logical CDEs associated with the initial transmission, with each of the L-1 instances occurring at integer multiples of the retransmission interval ($\Delta$). As shown in FIG. 12, a first retransmission may occur at time N-$\Delta$ (shown as arrow 1210), an i-th retransmission may occur at time N-i$\Delta$ (shown as arrow 1215), an X-th retransmission may occur at time N-X$\Delta$ (shown as arrow 1220), and the like.

In general, an i-th decoding attempt occurs at time N-i$\Delta$ (as indicated by arrow 1215). At an i-th decoding trial, the UE combines the log-likelihood ratios (LLRs) of a FEC block from the initial transmission (arrow 1205) and the last i-1 transmissions into a combined data block and attempts to decode the combined data block. As an example, at the i-th decoding attempt the UE combines the LLRs of the buffered data corresponding to the i instances (from times N-i$\Delta$, N-(i-1)$\Delta$, N-$\Delta$, and N) to produce a combined data block and attempts to decode the combined data block. If the decoding is not successful, the UE performs the (i+1)-th decoding attempt by combining the buffered data corresponding to the i+1 instance (from time N-(i+1)$\Delta$) with the combined data block from the i-th decoding attempt and attempts to decode the combined data block. It is noted that in the above example, i and i+1 are both smaller than L.

For discussion purposes, consider a situation wherein at an X-th decoding attempt (as indicated by arrow 1220) the UE was successful in decoding the transmission. The decoding stops and the UE sends an ACK to the sender (as indicated by arrow 1225). The sender may then consider the transmission as being successful and stop transmissions.

For discussion purposes, consider a situation where none of the decoding trials attempted by the UE succeed. Then, after L decoding attempts (as indicated by arrow 1230), the UE considers the transmission to have failed because it has attempted a total of L decoding attempts and it was still unable to successfully decode the transmission. The HARQ reception operations for the initial transmission may then stop. Notably, the whole process may not be successful for two main reasons, i) the HARQ reception operation is not over the right period of time, i.e., at least one packet of a time instance within the interval N-(L-1)$\Delta$ to N does not belong to the UE, or ii) the whole packets in the time interval N-(L-1)$\Delta$ to N does belong to a full HARQ process of the intended UE but UE is not able to decode the transmitted data due to a bad channel condition. It is noted that a UE cannot recognize the reason of an unsuccessful HARQ reception operation.

It is noted that a maximum number of HARQ processes per UE is expressible as $\Delta$/transmission_interval. As an example, if a UE has a transmission interval (is allowed to be scheduled) of 2 TTIs according to a particular SSFTx configuration and the HARQ interval ($\Delta$) is 8, the total number of HARQ processes per UE is equal to 8/2=4.

Figure 13A:
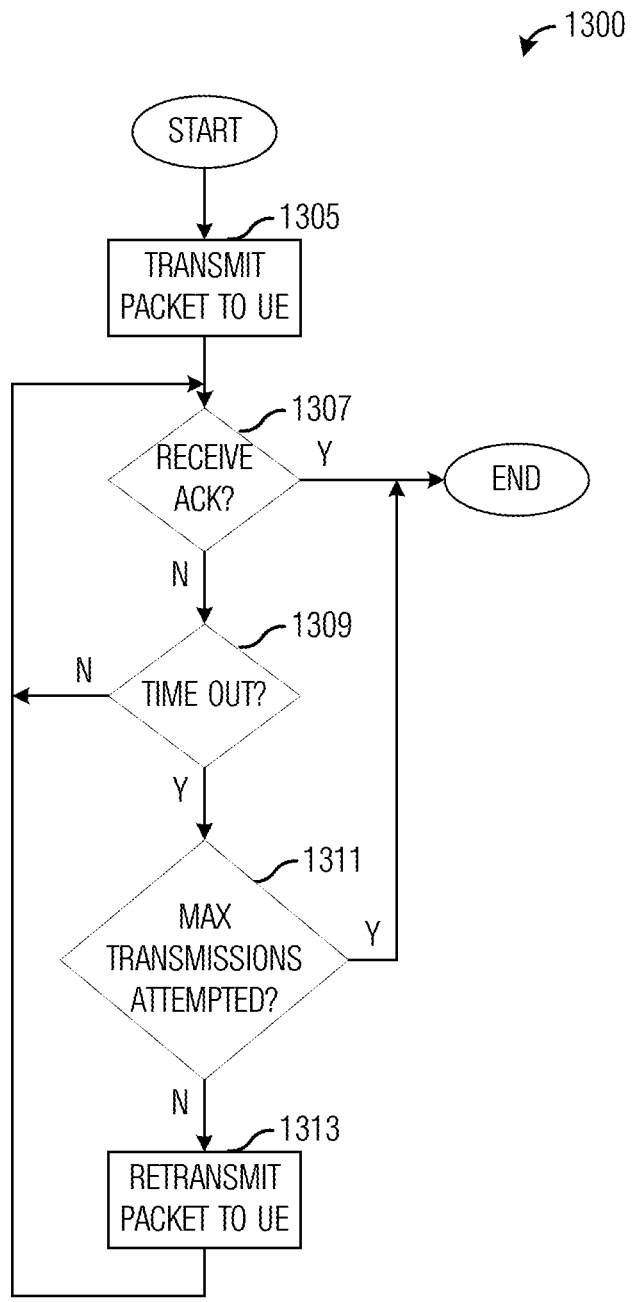
FIG. 13a illustrates a flow diagram of operations occurring in an eNB as the eNB transmits to a UE using a blind HARQ process according to example embodiments described herein.

FIG. 13a illustrates a flow diagram of operations 1300 occurring in an eNB as the eNB transmits to a UE using a blind HARQ process. Operations 1300 may be indicative of operations occurring in an eNB, such as eNB 105, as the eNB transmits to a UE using a blind HARQ process.

Operations 1300 may begin with the eNB transmitting a packet to the UE (block 1305). The packet may be an initial transmission to the UE. The eNB may perform a check to determine if it has received an ACK from the UE (block 1307). If the eNB has received an ACK from the UE, the eNB may consider the transmission of the packet to have succeeded.

If the eNB has not received an ACK, the eNB may perform a check to determine an ACK timer has expired (i.e., a maximum amount of time the eNB is permitted to wait for an ACK) (block 1309). If the ACK timer has not expired, the eNB may return to block 1307 to wait for an ACK. If the ACK timer has expired, then the eNB may perform a check to determine if it has performed a maximum number of transmissions of the packet (block 1311). If the eNB has not performed the maximum number of transmissions of the packet, the eNB may retransmit the packet to the UE (block 1313) and return to block 1307 to wait for an ACK. If the eNB has performed the maximum number of transmissions of the packet, the eNB may consider the transmission of the packet has failed. The eNB may attempt to transmit the packet again at a later time or it may not attempt to transmit the packet.

Figure 13B:
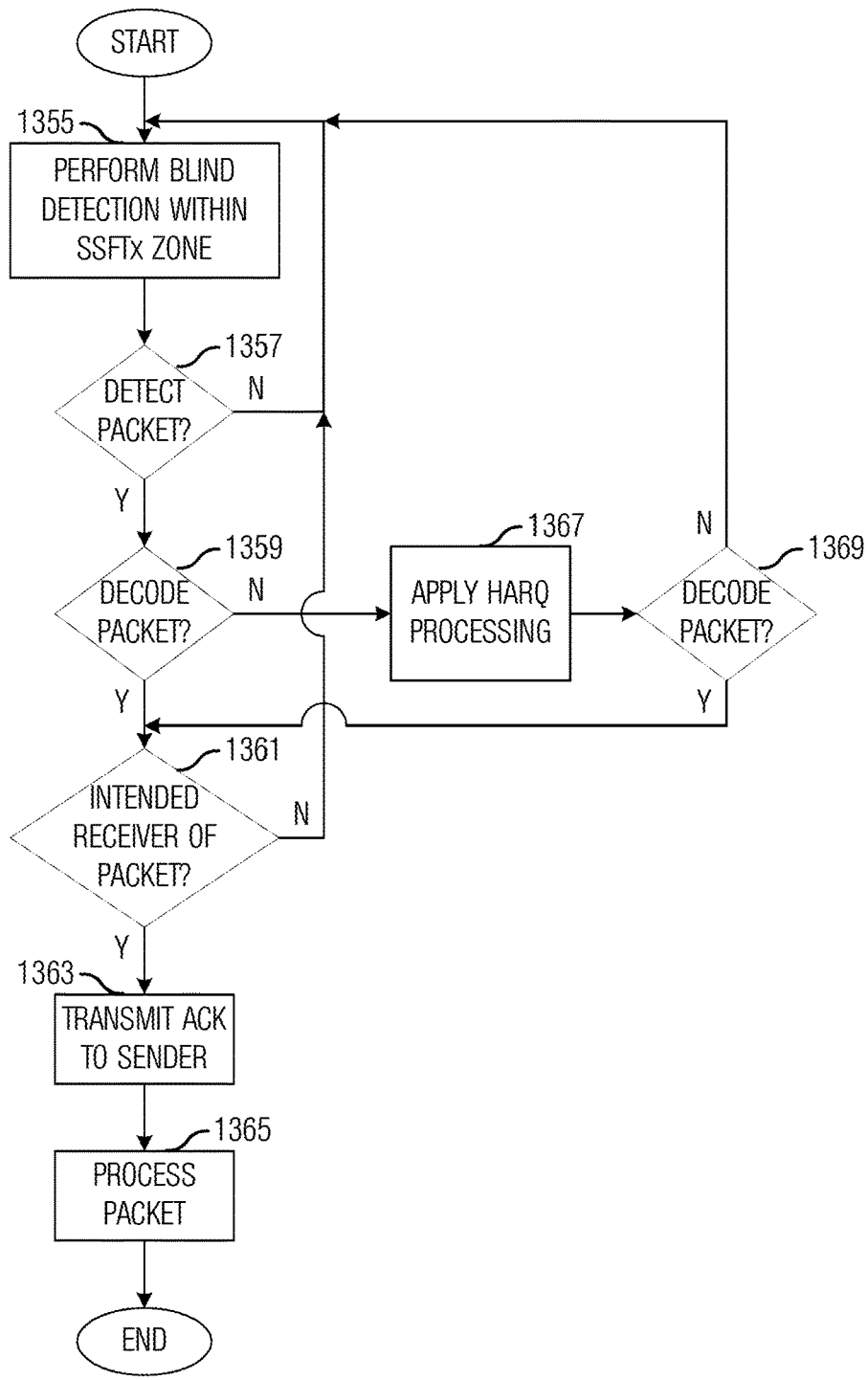
FIG. 13b illustrates an example flow diagram of operations occurring in a UE as the UE receives a transmission and decodes the transmission according to example embodiments described herein.

FIG. 13*b* illustrates a flow diagram of operations 1350 occurring in a UE as the UE receives a transmission and decodes the transmission. Operations 1350 may be indicative of operations occurring in a UE, such as UEs 110-116, as the UE receives a transmission from an eNB and decodes the transmission.

Operations 1350 may begin with the UE detecting within an SSFTx zone for a packet (block 1355). According to an example embodiment, the UE may utilize blind detection to find packets within the SSFTx zone. The UE may perform a check to determine if it has detected a packet within the SSFTx zone (block 1357). If the UE has not detected a packet, the UE may return to block 1355 to continue with detecting packets. If the UE has detected a packet, the UE may perform a check to determine if it is able to decode the packet (block 1359).

If the UE is able to decode the packet, the UE may perform a check to determine if it is the intended receiver (recipient) of the packet (block 1361). As an illustrative example of a predefined protocol, if the sender masks the CRC by the ID of the intended UE, then when a UE successfully checks a CRC, UE concludes that it is the intended recipient of the decoded packet. Alternatively, if the CRC is not masked but a packet header contains a UE identifying information, the UE may check in the packet's header after a successful CRC check for the presence of its identifying information, such as its identifier. If its identifying information is in the header of the packet, then the UE is the intended recipient of the packet. If the UE is the intended recipient of the packet, the UE may send an ACK to the sender (block 1363) and process the contents of the packet (block 1365). If the UE is not the intended recipient of the packet, then the UE may return to block 1355 to continue performing blind detection in the SSFTx zone.

If the UE cannot decode the packet (block 1359), the UE may apply HARQ reception processing to attempt to recover the packet (block 1367). The UE may apply the blind HARQ processing technique as described previously to recover the packet. A detailed description of an example blind HARQ reception processing technique is provided below. The UE may perform a check to determine if it was able to decode the packet after applying the blind HARQ reception processing technique (block 1369). If the UE was not able to decode the packet, the UE may return to block 1355 to continue performing blind detection in the SSFTx zone. If the UE was able to decode the packet, the UE may go to block 1361 to determine if it is the intended receiver of the packet.

Figure 13C:
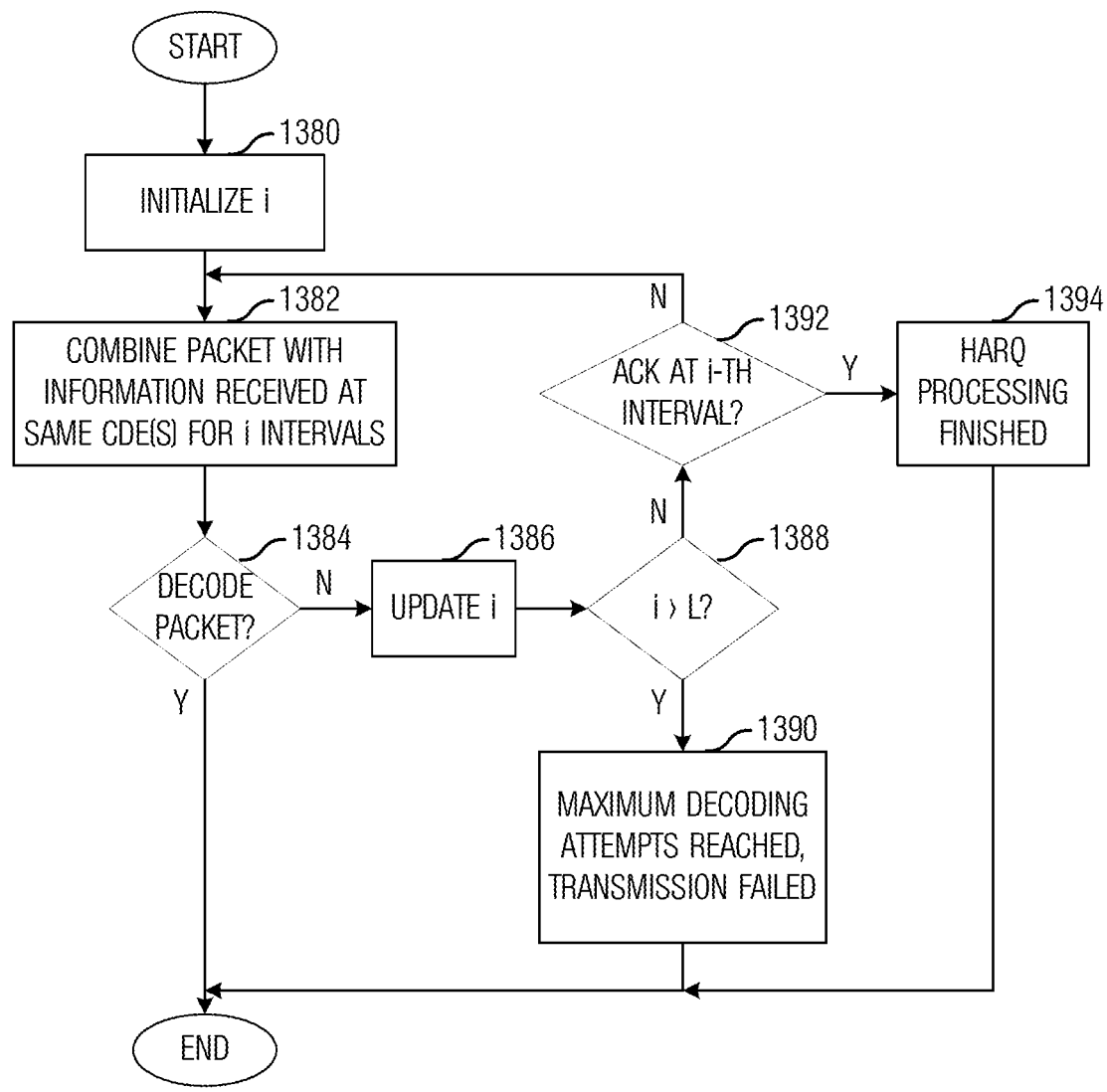
FIG. 13c illustrates an example flow diagram of operations occurring in a UE as the UE performs HARQ reception processing according to example embodiments described herein.

FIG. 13*c* illustrates a flow diagram of operations 1375 occurring in a UE as the UE applies a blind HARQ reception processing technique to recover a packet transmission. Operations 1375 may be indicative of operations occurring in a UE, such as UEs 110-116, as the UE uses a blind HARQ reception processing technique to recover a packet transmission.

Operations 1375 may begin with the UE initializing variables, such as a count of decoding attempts i (block 1380). As an illustrative example, i may be initialized to a 0. The UE may, for an i-th decoding attempt, combine buffered data corresponding to the i instances using LLR, for example, to produce a combined data block (block 1382). As an example, if i is equal to 3, the UE may combine buffered data corresponding to the hypothetically assumed initial transmission, buffered data corresponding to a first transmission at a transmission interval immediately prior to the initial transmission, and buffered data corresponding to a second transmission at a transmission interval immediately prior to the transmission interval of the first transmission into the combined data block.

The UE may perform a check to determine if it is able to decode the combined data block (block 1384). If the UE is able to decode the combined data block, the transmission is deemed to be successful and operations 1375 may terminate. If the UE is unable to decode the combined data block, the UE may update i (block 1386). As an example, if i was originally set to 0, updating i may entail incrementing i. The UE may perform a check to determine if it has performed a maximum number of permitted decoding attempts, i.e., is i>L (block 1388). As discussed previously, the eNB may perform a maximum of L transmissions (including retransmissions) of a packet before it is deemed that the transmission has failed. Therefore, the UE may expect to perform up to L decoding attempts. If the UE has performed L decoding attempts, the maximum number of decoding attempts has been reached and the transmission has failed (block 1390). However, if the UE has performed fewer than L decoding attempts, the UE may continue to perform decoding attempts.

The UE may perform a check to determine if there is an ACK at the i-th transmission interval (block 1392). Since the UE is examining buffered data, it is examining previously received or transmitted data. In such a situation, it may be possible that the UE has already successfully decoded a prior transmission and transmitted an ACK corresponding to the prior transmission at the i-th transmission interval. If there is an ACK at the i-th transmission interval, the UE may determine that HARQ processing is complete without it being able to decode the initial transmission (block 1394) and operations 1375 may terminate. If there is not an ACK at the i-th transmission interval, the UE may return to block 1382 to continue attempting to decode the initial transmission by combining buffered data corresponding to the i-th transmission interval with the previously combined data block.

Figure 14A:
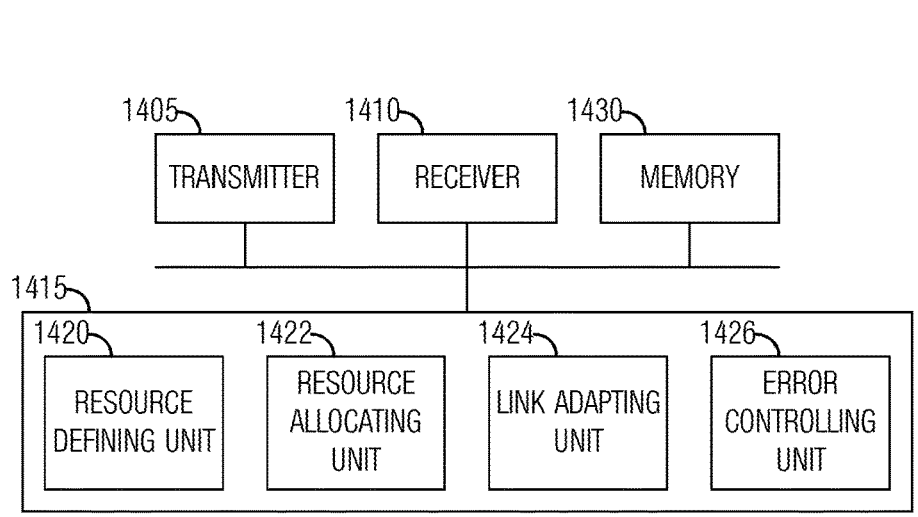
FIGS. 14a through 14d illustrate example views of a first communications device according to example embodiments described herein.

FIG. 14*a* illustrates a first communications device 1400. Communications device 1400 may be an implementation of a communications controller, such as a base station, an access point, an NodeB, an eNB, and the like. Communications device 1400 may be used to implement various ones of the embodiments discussed herein. As shown in FIG. 14*a*, a transmitter 1405 is configured to transmit packets, CSI, control signals, and the like. Communications device 1400 also includes a receiver 1410 that is configured to receive packets, CSI, and the like.

A resource defining unit 1420 is configured to specify SSFTx zones, SSFTx zone parameters, assign UEs to SSFTx zones, and the like. A resource allocating unit 1422 is configured to assign CDEs (logical CDEs and physical CDEs) to UEs that have transmissions and/or data. A link adaptation unit 1424 is configured to adjust a communications channel, such as its code rate, transmit power level, modulation technique, and the like. Link adaptation unit 1424 may adjust the communications channel to meet changing conditions for the UEs served by communications device 1400. An error controlling unit 1426 is configured to control transmissions and retransmissions to help ensure delivery of transmitted packets. A memory 1430 is configured to store packets, SSFTx zone information, UE assignments, CDE assignments, CDE mappings, link adaptation rules, CSI, mapping rules, and the like.

The elements of communications device 1400 may be implemented as specific hardware logic blocks. In an alternative, the elements of communications device 1400 may be implemented as software executing in a processor, controller, application specific integrated circuit, or so on. In yet another alternative, the elements of communications device 1400 may be implemented as a combination of software and/or hardware.

As an example, receiver 1410 and transmitter 1405 may be implemented as a specific hardware block, while resource defining unit 1420, resource allocating unit 1422, link adaptation unit 1424, and error controlling unit 1426 may be software modules executing in a microprocessor (such as processor 1415) or a custom circuit or a custom compiled logic array of a field programmable logic array. Resource defining unit 1420, resource allocating unit 1422, link adaptation unit 1424, and error controlling unit 1426 may be modules stored in memory 1430.

Figure 14B:
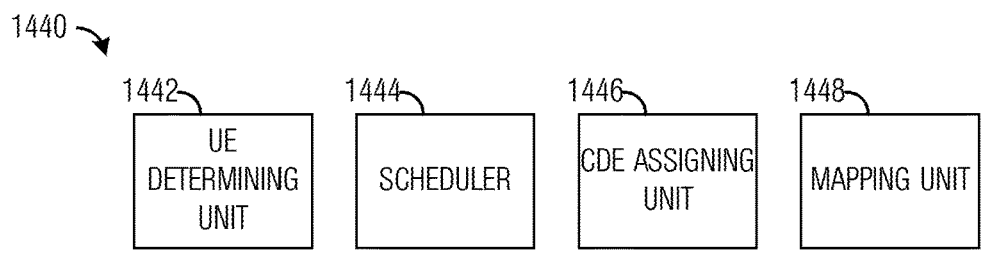

FIG. 14b illustrates a detailed view of a resource allocating unit 1440. Resource allocating unit 1440 may include a UE determining unit 1442 configured to select UEs out of UEs served by communications device 1400 that will receive transmissions within a particular transmission interval. A scheduler 1444 may schedule the selected UEs determined by UE determining unit 1442. Scheduler 1444 may determine how many CDEs to assign to each selected UE, for example. A CDE assigning unit 1446 may assign logical CDEs to the selected UEs in accordance with scheduling information provided by scheduler 1444. A mapping unit 1448 is configured to map logical CDEs assigned to the selected UEs to physical CDEs.

Figure 14C:
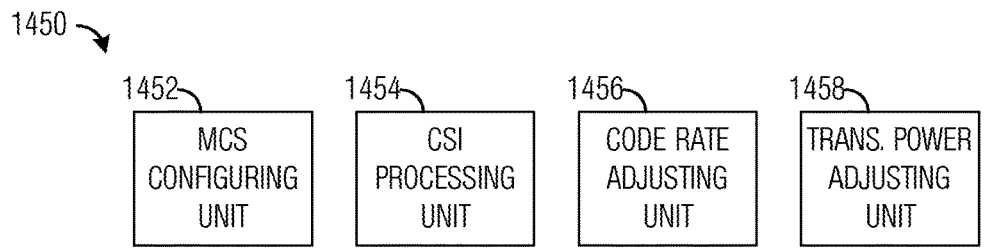

FIG. 14c illustrates a detailed view of a link adapting unit 1450. Link adapting unit 1450 may include a MCS configuring unit 1452 configured to select a MCS level for a transmission to a UE. MCS configuring unit 1452 may select the MCS level based on criteria including UE capability, network capability, network condition, traffic characteristics, and the like. A CSI processing unit 1454 may process CSI, such as long-term CSI, received from a UE or CSI measurements made by communications device 1400 to determine adjustments to the MCS if any are warranted. A code rate adjusting unit 1456 may adjust a code rate of transmissions to a UE in accordance to the CSI. Code rate adjusting unit 1456 may adjust the code rate using a mapping rule that specifies a code rate for a given CSI. A transmit power adjust unit 1458 may adjust a transmit power level of selected UEs within a SSFTx zone based on the number of selected UEs and a total transmit power for communications device 1400 transmissions within the SSFTx zone.

Figure 14D:
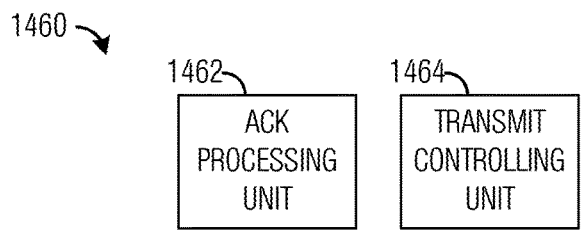

FIG. 14d illustrates an error controlling unit 1460. Error controlling unit 1460 may include an acknowledgement processing unit 1462 configured to process ACKs and/or NACKs received from UEs. Acknowledgement processing unit 1462 may control transmissions and retransmissions of packets based on received ACKs, NACKs, or no acknowledgement at all. A transmit controlling unit 1464 may control buffering of packets for transmission and/or retransmission purposes, maintain a count of transmission attempts, control CDE mappings, and the like, for transmissions and/or retransmissions.

Figure 15A:
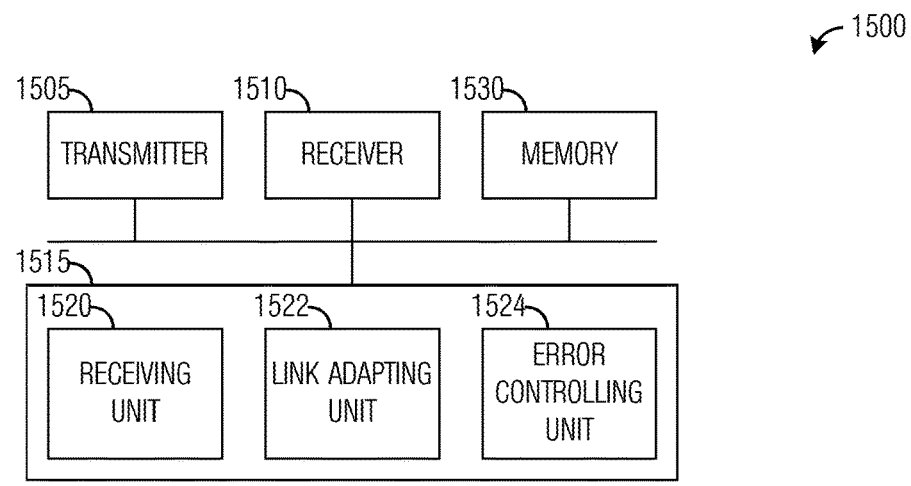
FIGS. 15a through 15d illustrate example views of a second communications device according to example embodiments described herein.

FIG. 15a illustrates a second communications device 1500. Communications device 1500 may be an implementation of a communicating device, such as a UE, mobile, mobile station, subscriber, terminal, user, and the like. Communications device 1500 may be used to implement various ones of the embodiments discussed herein. As shown in FIG. 15a, a transmitter 1505 is configured to transmit packets, CSI, and the like. Communications device 1500 also includes a receiver 1510 that is configured to receive packets, control signals, and the like.

A receiving unit 1520 is configured to perform blind detection to detect packets transmitted in a SSFTx zone. Receiving unit 1520 is configured to determine if detected packets are intended for communications device 1500, and to decode the detected packets. A link adapting unit 1522 is configured to adjust the configuration of receiving unit 1520 to meet changes in MCS used in transmissions to transmission device 1500. Link adapting unit 1522 may adjust a code rate in accordance with CSI of a communications channel, for example. An error controlling unit 1524 is configured to generate ACKs in accordance with a successful or unsuccessful decoding attempt. Error controlling unit 1524 is configured to combine data from multiple transmissions of a single packet to potentially improve the probability of successful decode of the packet. A memory 1530 is configured to store packets, SSFTx zone information, link adaptation rules, CSI, mapping rules, data, combined data, and the like.

The elements of communications device 1500 may be implemented as specific hardware logic blocks. In an alternative, the elements of communications device 1500 may be implemented as software executing in a processor, controller, application specific integrated circuit, or so on. In yet another alternative, the elements of communications device 1500 may be implemented as a combination of software and/or hardware.

As an example, receiver 1510 and transmitter 1505 may be implemented as a specific hardware block, while receiving unit 1520, link adaptation unit 1522, and error controlling unit 1524 may be software modules executing in a microprocessor (such as processor 1515) or a custom circuit or a custom compiled logic array of a field programmable logic array. Receiving unit 1520, link adaptation unit 1522, and error controlling unit 1524 may be modules stored in memory 1530.

Figure 15B:
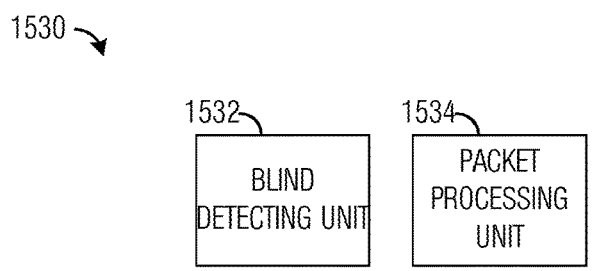

FIG. 15b illustrates a detailed view of a receiving unit 1530. Receiving unit 1530 may include a blind detecting unit 1532 configured to use blind detection with a variety of signatures to detect packets within a SSFTx zone. Examples of blind detecting unit 1532 include blind detectors shown in FIGS. 8a and 8b. A packet processing unit 1534 may process packets and data contained therein.

Figure 15C:
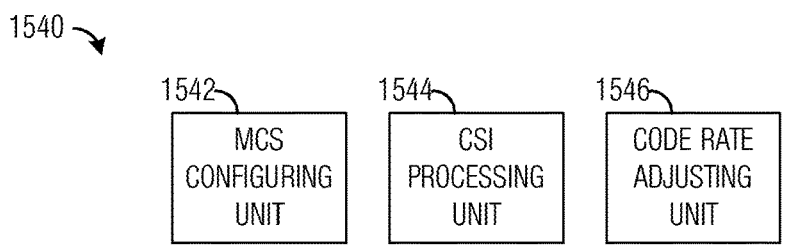

FIG. 15c illustrates a detailed view of a link adapting unit 1540. Link adapting unit 1540 may include a MCS configuring unit 1542 configured to set up a receiver of communications device 1500 in accordance with a specified MCS level. A CSI processing unit 1544 may process CSI measured by communications device 1500 or received from an eNB serving communications device 1500 to determine long-term CSI, such as channel geometry. A code rate adjusting unit 1546 may adjust a code rate used in the receiver of communications device 1500 in accordance with the long-term CSI. Code rate adjusting unit 1546 may use a mapping rule to determine the code rate from the long-term CSI, for example.

Figure 15D:
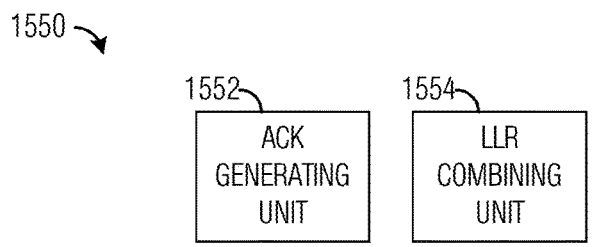

FIG. 15d illustrates a detailed view of an error controlling unit 1550. Error controlling unit 1550 may include an acknowledgement generating unit 1552 configured to generate an ACK or a NACK in accordance with a successful or unsuccessful decoding attempt. A LLR combining unit 1554 may combine data from a packet and previous transmissions of the packet to produce combined data. Communications device 1500 may attempt to decode the combined data.

Although the present disclosure and its advantages have been described in detail, it should be understood that various changes, substitutions and alterations can be made herein without departing from the spirit and scope of the disclosure as defined by the appended claims.

What is claimed is:

1. A method for operating a communications controller, the method comprising:
    assigning, by the communications controller, code domain elements (CDEs) of a scheduling signal free transmission (SSFTx) zone to a plurality of user equipments (UEs) being served by the communications controller and operating in the SSFTx zone, the CDEs mapped to a plurality of network resources associated with the SSFTx zone;
    instructing a transmitter to transmit a first UE's downlink data to the first UE in the plurality of UEs based on a first CDE of the CDEs and a second UE's downlink data to the second UE in the plurality of UEs based on a second CDE of the CDEs, the first CDE having been assigned to the first UE and the second CDE having been assigned to the second UE, the first UE's downlink data being transmitted to the first UE over network resources mapped to the first CDE using a first transmit power level determined according to the first CDE and the second UE's downlink data being transmitted to the second UE different from the first UE over network resources mapped to the second CDE using a second transmit power level determined according to the second CDE different from the first CDE,
    wherein at least a portion of the network resources mapped to the first CDE overlap in the time and frequency domains with at least a portion of the network resources mapped to the second CDE, and
    wherein the CDEs are separated in a code domain by one of spreading codes, signatures, or codebooks; and
    signaling a modulation and coding scheme (MCS) to each UE of the plurality of UEs operating in the SSFTx zone, wherein the same MCS is assigned to the plurality of UEs operating in the SSFTx zone.

2. The method of claim 1, wherein each of the CDEs fully occupies the plurality of network resources associated with the SSFTx zone.

3. The method of claim 1, further comprising, scheduling, by the communications controller, each UE operating in the SSFTx zone.

4. The method of claim 1, further comprising:
    receiving channel state information from a third UE of the plurality of UEs; and
    adjusting a code rate for a first transmission intended for the third UE in accordance with the channel state information.

5. The method of claim 1, further comprising assigning the CDEs in accordance with a target link quality.

6. The method of claim 1, wherein the plurality of UEs are assigned with different CDEs, and the CDEs are orthogonal to one another in the code domain.

7. The method of claim 1, wherein network resources associated with the SSFTx zone in a first transmission time interval (TTI) in a first frame at least in part differ in the frequency domain from network resources associated with the SSFTx zone in a second TTI in the first frame, and the network resources associated with the SSFTx zone in the first TTI in the first frame at least in part overlap in the frequency domain with network resources associated with the SSFTx zone in a TTI corresponding to the first TTI in a second frame.

8. The method of claim 1, wherein a number of the CDEs assigned to each UE is determined based on an amount of data to be transmitted to the each UE.

9. The method of claim 1, further comprising:
    setting an MCS level for all of the plurality of UEs in the SSFTx zone, where the plurality of UEs use information about the SSFTx zone to infer the MCS level.

10. The method of claim 1, further comprising:
    before the instructing:
        determining the first transmit power level according to the first CDE; and
        determining the second transmit power level according to the second CDE.

11. A communications controller comprising:
    a processor configured to assign code domain elements (CDEs) of a scheduling signal free transmission (SSFTx) zone to a plurality of user equipments (UEs) being served by the communications controller and operating in the SSFTx zone, the CDEs mapped to a plurality of network resources associated with the SSFTx zone; and
    a transmitter operatively coupled to the processor, the transmitter configured to:
        transmit a first UE's downlink data to the first UE in the plurality of UEs based on a first CDE of the CDEs and a second UE's downlink data to a second UE in the plurality of UEs based on a second CDE of the CDEs, the first CDE having been assigned to the first UE and the second CDE having been assigned to the second UE, the first UE's downlink data being transmitted to the first UE over network resources mapped to the first CDE using a first transmit power level determined according to the first CDE and the second UE's downlink data being transmitted to the second UE different from the first UE over network resources mapped to the second CDE using a second transmit power level determined according to the second CDE different from the first CDE,
        wherein at least a portion of the network resources mapped to the first CDE overlap in the time and frequency domains with at least a portion of the network resources mapped to the second CDE, and
        wherein the CDEs are separated in a code domain by one of spreading codes, signatures, or codebooks; and
        signal a modulation and coding scheme (MCS) to each UE of the plurality of UEs operating in the SSFTx zone, wherein the same MCS is assigned to the plurality of UEs operating in the SSFTx zone.

12. The communications controller of claim 11, wherein the transmitter is configured to map the CDEs to the plurality of network resources associated with the SSFTx zone, and to broadcast the plurality of network resources to the UEs.

13. The communications controller of claim 12, wherein each of the CDEs fully occupies the plurality of network resources associated with the SSFTx zone.

14. The communications controller of claim 11, wherein the processor is configured to schedule each UE operating in the SSFTx zone.

15. The communications controller of claim 11, further comprising a receiver operatively coupled to the processor, the receiver configured to receive channel state information from a third UE of the plurality of UEs, and wherein the processor is configured to adjust a code rate for a first transmission associated with the third UE in accordance with the channel state information.

16. The communications controller of claim 11, wherein the processor is configured to adjust the at least one transmit power level of transmissions to each UE operating in the SSFTx zone.

17. A method for operating a base station, the method comprising:
assigning code domain elements (CDEs) of a scheduling signal free transmission (SSFTx) zone to a plurality of user equipments (UEs) being served by the base station and operating in the SSFTx zone, the CDEs mapped to a plurality of network resources associated with the SSFTx zone;
transmitting a first UE's downlink data to the first UE in the plurality of UEs based on a first CDE of the CDEs;
transmitting a second UE's downlink data to the second UE in the plurality of UEs based on a second CDE of the CDEs, the first CDE having been assigned to the first UE and the second CDE having been assigned to the second UE, the first UE's downlink data being transmitted to the first UE over network resources mapped to the first CDE using a first transmit power level determined according to the first CDE and the second UE's downlink data being transmitted to the second UE different from the first UE over network resources mapped to the second CDE using a second transmit power level determined according to the second CDE different from the first CDE,
wherein at least a portion of the network resources mapped to the first CDE overlap in the time and frequency domains with at least a portion of the network resources mapped to the second CDE, and
wherein the CDEs are separated in a code domain by one of spreading codes, signatures, or codebooks; and
signaling a modulation and coding scheme (MCS) to each UE of the plurality of UEs operating in the SSFTx zone, wherein the same MCS is assigned to the plurality of UEs operating in the SSFTx zone.

18. The method of claim 17, wherein each of the CDEs fully occupies the plurality of network resources associated with the SSFTx zone.

19. The method of claim 17, further comprising:
receiving channel state information from a third UE of the plurality of UEs; and
adjusting a code rate for a first transmission intended for the third UE in accordance with the channel state information.

20. The method of claim 17, further comprising assigning the CDEs in accordance with a target link quality.

21. A communications controller comprising:
a processor configured to assign code domain elements (CDEs) of a scheduling signal free transmission (SSFTx) zone to a plurality of user equipments (UEs) being served by the communications controller and operating in the SSFTx zone;
a transmitter operatively coupled to the processor, the transmitter configured to:
map the CDEs to a plurality of network resources associated within the SSFTx zone and to transmit a first UE's downlink data to the first UE of the plurality of UEs based on a first CDE of the CDEs and to transmit a second UE's downlink data to the second UE in the plurality of UEs based on a second CDE of the CDEs, the first CDE having been assigned to the first UE and the second CDE having been assigned to the second UE, the first UE's downlink data being transmitted to the first UE over network resources mapped to the first CDE using a first transmit power level determined according to the first CDE and the second UE's downlink data being transmitted to the second UE different from the first UE over network resources mapped to the second CDE using a second transmit power level determined according to the second CDE different from the first CDE, wherein at least a portion of the network resources mapped to the first CDE overlap in the time and frequency domains with at least a portion of the network resources mapped to the second CDE; and
signal a modulation and coding scheme (MCS) to each UE of the plurality of UEs operating in the SSFTx zone, wherein the same MCS is assigned to the plurality of UEs operating in the SSFTx zone
a receiver operatively coupled to the processor, the receiver configured to receive channel state information from a third UE of the plurality of UEs,
wherein the processor is further configured to adjust a code rate for a first transmission associated with the third UE in accordance with the channel state information, and
wherein the CDEs are separated in a code domain by one of spreading codes, signatures, or codebooks.

22. The communications controller of claim 21, wherein the processor is configured to schedule each of the plurality of UEs operating in the SSFTx zone.

* * * * *